US012424148B2

(12) United States Patent

Yeom et al.

(10) Patent No.: US 12,424,148 B2
(45) Date of Patent: Sep. 23, 2025

(54) LUMINANCE COMPENSATION METHOD OF DISPLAY DEVICE BY ADJUSTING INITIALIZATION CONTROL SIGNAL AND DISPLAY DEVICE

(71) Applicant: Samsung Display Co., LTD., Yongin-si (KR)

(72) Inventors: Seongoh Yeom, Yongin-si (KR); Yu-Chol Kim, Yongin-si (KR); Jihye Kim, Yongin-si (KR); Jin-Wook Yang, Yongin-si (KR); Eui-Myeong Cho, Yongin-si (KR); Jakyoung Jin, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/493,977

(22) Filed: Oct. 25, 2023

(65) Prior Publication Data

US 2024/0257720 A1 Aug. 1, 2024

(30) Foreign Application Priority Data

Jan. 30, 2023 (KR) ........................ 10-2023-0011520

(51) Int. Cl.
*G09G 3/32* (2016.01)

(52) U.S. Cl.
CPC ........... *G09G 3/32* (2013.01); *G09G 2310/08* (2013.01); *G09G 2320/0233* (2013.01); *G09G 2320/0247* (2013.01); *G09G 2360/16* (2013.01)

(58) Field of Classification Search
CPC ........................................................ G09G 3/32
USPC ........................................................... 345/55
See application file for complete search history.

(56) References Cited

U.S. PATENT DOCUMENTS

| | | | |
|---|---|---|---|
| 10,937,370 | B2 | 3/2021 | Son |
| 11,263,976 | B2 | 3/2022 | Yang et al. |
| 11,322,077 | B1 | 5/2022 | Chun |
| 11,423,834 | B2 | 8/2022 | Park et al. |
| 11,640,794 | B2 | 5/2023 | Yang et al. |

(Continued)

FOREIGN PATENT DOCUMENTS

| | | | |
|---|---|---|---|
| KR | 20180007593 | A | 1/2018 |
| KR | 20200057204 | A | 5/2020 |

(Continued)

*Primary Examiner* — Long D Pham
(74) *Attorney, Agent, or Firm* — CANTOR COLBURN LLP

(57) ABSTRACT

A luminance compensation method of a display device includes a first luminance for a reference grayscale at a first operating frequency and a second luminance for the reference grayscale at a second operating frequency are measured. A first reference value is calculated based on the first luminance and the second luminance, a first duty ratio of the initialization control signal is changed into a second duty ratio depending on a comparison result of the first reference value and a threshold value After the first duty ratio is changed into the second duty ratio, a third luminance for the reference grayscale is measured, and a second reference value is calculated based on the first luminance and the third luminance. A final duty ratio corresponding to the threshold value is calculated depending on a comparison result of the second reference value and the threshold value.

20 Claims, 19 Drawing Sheets

(56) References Cited

U.S. PATENT DOCUMENTS

| | | | | |
|---|---|---|---|---|
| 2020/0082768 | A1* | 3/2020 | Oh | G09G 3/3291 |
| 2021/0183290 | A1* | 6/2021 | Sato | G09G 3/20 |
| 2021/0407436 | A1* | 12/2021 | Park | G09G 3/3233 |
| 2022/0051620 | A1 | 2/2022 | Song et al. | |
| 2022/0084472 | A1* | 3/2022 | Kim | G09G 3/3266 |

FOREIGN PATENT DOCUMENTS

| | | | |
|---|---|---|---|
| KR | 20210100785 | A | 8/2021 |
| KR | 20220001034 | A | 1/2022 |
| KR | 20220021059 | A | 2/2022 |
| KR | 20220092841 | A | 7/2022 |
| KR | 20220116873 | A | 8/2022 |

* cited by examiner

| | | 11G | 23G | 35G | 51G | 87G | 127G | 151G | 203G | 255G |
|---|---|---|---|---|---|---|---|---|---|---|
| G_GB3 | AP6_a:1.9us | 1.16% | -2.69% | -2.32% | -1.55% | 0.07% | 0.62% | 0.65% | 0.72% | 0.75% |
| G_GB2 | AP6_a:1.7us | 0.52% | -2.73% | -2.14% | -1.31% | 0.19% | 0.74% | 0.75% | 0.82% | 0.86% |
| G_GB1 | AP6_a:1.5us | -1.14% | -2.99% | -2.26% | -1.40% | 0.20% | 0.77% | 0.80% | 0.82% | 0.89% |
| G_GB4 | AP6_a:1.4us | -2.32% | -3.12% | -2.29% | -1.42% | 0.19% | 0.77% | 0.78% | 0.81% | 0.86% |
| G_GB5 | AP6_a:1.3us | -2.68% | -3.32% | -2.44% | -1.44% | 0.23% | 0.80% | 0.80% | 0.79% | 0.86% |

| | 11G | 23G | 35G | 51G | 87G | 127G | 151G | 203G | 255G |
|---|---|---|---|---|---|---|---|---|---|
| DP#1 | -0.12% | -1.46% | -1.04% | -0.33% | 0.30% | 0.44% | 0.45% | 0.46% | 0.44% |
| DP#2 | -0.10% | -1.48% | -0.98% | -0.32% | 0.29% | 0.45% | 0.45% | 0.48% | 0.45% |
| DP#3 | -0.13% | -1.24% | -0.77% | -0.12% | -0.37% | 0.47% | 0.51% | 0.48% | 0.46% |
| DP#4 | 0.01% | -1.38% | -0.97% | -0.30% | 0.43% | 0.54% | 0.59% | 0.57% | 0.54% |
| DP#5 | 0.06% | -1.19% | -0.92% | -0.16% | 0.35% | 0.54% | 0.49% | 0.46% | 0.45% |
| DP#6 | 0.02% | -1.40% | -0.87% | -0.19% | 0.34% | 0.52% | 0.47% | 0.49% | 0.50% |
| DP#7 | -0.09% | -1.49% | -1.05% | -0.36% | 0.33% | 0.56% | 0.57% | 0.55% | 0.52% |
| DP#8 | 0.02% | -1.18% | -0.89% | -0.10% | 0.40% | 0.54% | 0.51% | 0.48% | 0.47% |
| DP#9 | 0.03% | -1.12% | -0.83% | -0.05% | 0.44% | 0.57% | 0.55% | 0.49% | 0.51% |
| DP#10 | 0.08% | -1.08% | -0.76% | -0.10% | 0.43% | 0.53% | 0.53% | 0.54% | 0.52% |

| | | 11G | 23G | 35G | 51G | 87G | 127G | 151G | 203G | 255G |
|---|---|---|---|---|---|---|---|---|---|---|
| G_EM1 | 10% | 1.06% | -1.97% | -1.50% | -0.87% | 0.48% | 0.85% | 0.88% | 0.82% | 0.83% |
| G_EM2 | 15% | 1.08% | -2.27% | -1.22% | -0.05% | 0.79% | 0.99% | 0.91% | 0.83% | 0.86% |
| G_EM3 | 10% | 1.00% | -2.73% | -0.46% | 0.36% | 0.96% | 1.05% | 0.99% | 0.87% | 0.84% |
| G_EM4 | 15% | 1.84% | -3.01% | -1.82% | -0.34% | 0.71% | 0.96% | 0.91% | 0.89% | 0.90% |

| | 11G | 23G | 35G | 51G | 87G | 127G | 151G | 203G | 255G |
|---|---|---|---|---|---|---|---|---|---|
| Gh1 AINT:-3.5V | -8.63% | -4.84% | -3.06% | -1.67% | -0.05% | 0.48% | 0.56% | 0.61% | 0.63% |
| Gh2 AINT:-3.6V | 0.38% | -3.10% | -2.28% | -1.38% | 0.03% | 0.45% | 0.54% | 0.59% | 0.61% |
| Gh3 AINT:-3.7V | 7.90% | -1.51% | -1.70% | -1.21% | 0.08% | 0.50% | 0.50% | 0.55% | 0.62% |
| Gh4 AINT:-3.8V | 15.87% | 0.20% | -1.19% | -0.95% | 0.10% | 0.47% | 0.53% | 0.44% | 0.60% |

| | 11G | 23G | 35G | 51G | 87G | 127G | 151G | 203G | 255G |
|---|---|---|---|---|---|---|---|---|---|
| Gh5 VINT-3.5V | -1.94% | -2.28% | -1.64% | -0.85% | 0.49% | 0.72% | 0.77% | 0.70% | 0.63% |
| Gh6 VINT-3.0V | 0.36% | -1.72% | -1.19% | -0.58% | 0.64% | 0.80% | 0.78% | 0.72% | 0.63% |
| Gh7 VINT-2.5V | 3.13% | -0.74% | -0.71% | -0.32% | 0.77% | 0.87% | 0.80% | 0.72% | 0.62% |

LUMINANCE COMPENSATION METHOD OF DISPLAY DEVICE BY ADJUSTING INITIALIZATION CONTROL SIGNAL AND DISPLAY DEVICE

This application claims priority to Korean Patent Application No. 10-2023-0011520, filed on Jan. 30, 2023, and all the benefits accruing therefrom under 35 U.S.C. § 119, the content of which in its entirety is herein incorporated by reference.

BACKGROUND

1. Field

Embodiments described herein relate to a display device and a luminance compensation method of the display device, and more particularly, to a display device and a luminance compensation method of the display device capable of performing a compensation operation such that the display device has uniform luminance characteristics.

2. Description of Related Art

A light emitting display device among display devices displays an image by using a light emitting diode that generates light through the recombination of electrons and holes. The light emitting display device is driven with low power while providing a fast response speed.

The light emitting display device includes pixels connected to data lines and scan lines. Each of the pixels generally includes a light emitting diode, and a pixel circuit unit for controlling the amount of current flowing to the light emitting diode. In response to a data signal, the pixel circuit unit may control the amount of current that flows from a terminal, to which a first driving voltage is applied, and to a terminal, to which a second driving voltage is applied, via the light emitting diode.

SUMMARY

Embodiments provide a method for compensating for the luminance of a display device to have uniform luminance characteristics even though an operating frequency is variable.

Embodiments provide a display device that is driven to have uniform luminance characteristics even when an operating frequency is varied.

According to an embodiment, in a method for compensating for luminance of a display device, the display device includes a light emitting element and a pixel driving circuit connected to the light emitting element and receiving an initialization control signal. The luminance compensation method includes measuring a first luminance for a reference grayscale at a first operating frequency, measuring a second luminance for the reference grayscale at a second operating frequency different from the first operating frequency, calculating a first reference value based on the first luminance and the second luminance, comparing the first reference value and a threshold value to output a first comparison result, changing a first duty ratio of the initialization control signal into a second duty ratio of the initialization control signal depending on the first comparison result, measuring a third luminance for the reference grayscale at the second operating frequency after the first duty ratio is changed into the second duty ratio, calculating a second reference value based on the first luminance and the third luminance, comparing the second reference value with the threshold value to output a second comparison result, and calculating a final duty ratio corresponding to the threshold value by using the first duty ratio and the second duty ratio depending on the second comparison result.

According to an embodiment, a display device includes a display panel including a plurality of pixels and a panel driver that drives the display panel in a first mode where an operating frequency is fixed and a second mode where the operating frequency is variable. Each of the plurality of pixels includes a light emitting element and a pixel driving circuit connected to the light emitting element and configured to receive an initialization control signal.

The panel driver determines whether the operating frequency corresponds to one of predetermined compensation frequencies in the second mode and adjusts a duty ratio of the initialization control signal depending on the determination result.

BRIEF DESCRIPTION OF THE FIGURES

The above and other objects and features of the invention will become apparent by describing in detail embodiments thereof with reference to the accompanying drawings.

DETAILED DESCRIPTION

Figure 1:
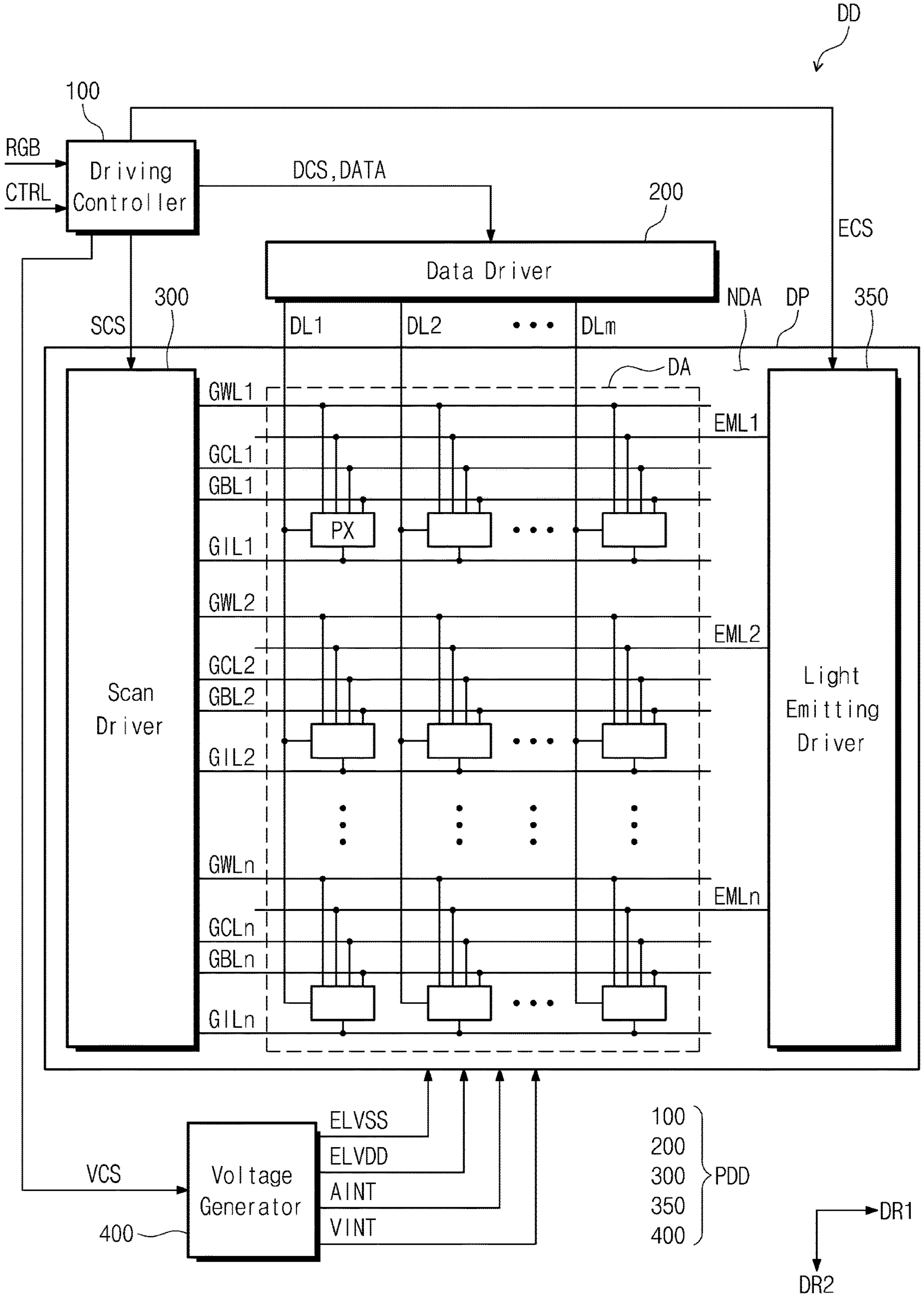
FIG. 1 is a schematic block diagram of a display device, according to an embodiment.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

The terminology used herein is for the purpose of describing particular embodiments only and is not intended to be limiting. As used herein, "a", "an," "the," and "at least one" do not denote a limitation of quantity, and are intended to include the plural forms as well, unless the context clearly indicates otherwise. Within the Figures and the text of the disclosure, a reference number indicating a singular form of an element may also be used to reference a plurality of the singular element.

Terms of "part" or "unit" means a software component or hardware component performing specific functions. The hardware component may include, for example, a field-programmable gate array (FPGA) or an application-specific integrated circuit (ASIC). The software component may refer to an executable code and/or data used by an executable code in an addressable recording medium. Accordingly, software components may be, for example, object-oriented software components, class components, and task components, and include processors, functions, attributes, procedures, subroutines, program code segments, drivers, firmware, microcode, circuits, data, databases, data structures, tables, arrays, and/or variables.

As used herein, being "disposed directly on" may mean that there is no additional layer, film, region, plate, or the like between a part and another part such as a layer, a film, a region, a plate, or the like. For example, being "disposed directly on" may mean that two layers or two members are disposed without using an additional member such as an adhesive member, therebetween.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present invention will be described with reference to the accompanying drawings.

FIG. 1 is a schematic block diagram of a display device, according to an embodiment.

In an embodiment and referring to FIG. 1, a display device DD may be a device that is activated depending on an electrical signal to display an image. The display device DD may be applied to an electronic device such as a smart watch, a tablet PC, a notebook, a computer, and/or a smart television.

In an embodiment, the display device DD includes a display panel DP and a panel driver PDD that drives the display panel DP. In an embodiment, the panel driver PDD may include a driving controller 100, a data driver 200, a scan driver 300, a light emitting driver 350, and a voltage generator 400.

In an embodiment, the driving controller 100 receives an image signal RGB and a control signal CTRL. The driving controller 100 generates image data DATA by converting a data format of the image signal RGB in compliance with the specification for an interface with the data driver 200. The driving controller 100 outputs a scan control signal SCS, a data control signal DCS, and an emission driving control signal ECS.

In an embodiment, the data driver 200 receives the data control signal DCS and the image data DATA from the driving controller 100. The data driver 200 converts the image data DATA into data signals and outputs the data signals to a plurality of data lines DL1 to DLm to be described later. The data signals refer to analog data voltages corresponding to grayscale values of the image data DATA.

In an embodiment, the voltage generator 400 generates voltages necessary to operate the display panel DP. In an embodiment, the voltage generator 400 generates a first driving voltage ELVDD, a second driving voltage ELVSS, an initialization voltage VINT, and an anode initialization voltage AINT. The initialization voltage VINT may have a voltage level different from that of the anode initialization voltage AINT. The voltage generator 400 generates voltages necessary to operate the display panel DP. In an embodiment, the voltage generator 400 may further generate a reference voltage Vref (see FIG. 2B) supplied to the display panel DP. The reference voltage Vref may have a lower voltage level than the first driving voltage ELVDD.

In an embodiment, the scan driver 300 receives the scan control signal SCS from the driving controller 100. The scan control signal SCS may include a start signal for starting an operation of the scan driver 300 and a plurality of clock signals. The scan driver 300 generates a plurality of scan signals and sequentially outputs the plurality of scan signals to scan lines described later. The light emitting driver 350 may output emission control signals to emission control lines EML1 to EMLn in response to the emission driving control signal ECS to be described later from the driving controller 100. In an embodiment, the scan driver 300 and the light emitting driver 350 may be integrated into one circuit.

In an embodiment, the scan driver 300 outputs initialization scan signals to initialization scan lines GIL1 to GILn of the display panel DP and outputs compensation scan signals to compensation scan lines GCL1 to GCLn of the display panel DP. The scan driver 300 outputs write scan signals to the write scan lines GWL1 to GWLn of the display panel DP, and outputs black scan signals to the black scan lines GBL1 to GBLn of the display panel DP.

In an embodiment, the display panel DP includes the initialization scan lines GIL1 to GILn, the compensation scan lines GCL1 to GCLn, the write scan lines GWL1 to GWLn, the black scan lines GBL1 to GBLn, emission control lines EML1 to EMLn, the data lines DL1 to DLm, and pixels PX. A display area DA and a non-display area NDA are defined in the display panel DP. The initialization scan lines GIL1 to GILn, the compensation scan lines GCL1 to GCLn, the write scan lines GWL1 to GWLn, the black scan lines GBL1 to GBLn, the emission control lines EML1 to EMLn, the data lines DL1 to DLm, and the pixels PX may be arranged in the display area DA. The initialization scan lines GIL1 to GILn, the compensation scan lines GCL1 to GCLn, the write scan lines GWL1 to GWLn, the black scan lines GBL1 to GBLn, and the emission control lines EML1 to EMLn extend in a first direction DR1 and are arranged to be spaced apart in a second direction DR2. The data lines DL1 to DLm extend in the second direction DR2 and are arranged to be spaced apart in the first direction DR1.

In an embodiment, the scan driver 300 and the light emitting driver 350 may be positioned in the non-display area NDA of the display panel DP. As an example, the scan driver 300 is positioned adjacent to one side of the display area DA, and the light emitting driver 350 is positioned adjacent to the other side of the display area DA opposite to the one side. In the example shown in FIG. 1, the scan driver 300 and the light emitting driver 350 are respectively positioned on opposite sides of the display area DA, but the invention is not limited thereto. For example, each of the scan driver 300 and the light emitting driver 350 may be positioned adjacent to one of one side or the other side of the display panel DP.

In an embodiment, the plurality of pixels PX are electrically connected to the initialization scan lines GIL1 to GILn, the compensation scan lines GCL1 to GCLn, the write scan lines GWL1 to GWLn, the black scan lines GBL1 to GBLn, the emission control lines EML1 to EMLn, and the data lines DL1 to DLm. Each of the plurality of pixels PX may be electrically connected to four scan lines and one emission control line. For example, as illustrated in FIG. 1, the first row of pixels may be connected to the first initialization scan line GIL1, the first compensation scan line GCL1, the first write scan line GWL1, the first black scan line GBL1, and the first emission control line EML1. Moreover, the second row of pixels may be connected to the second initialization scan line GIL2, the second compensation scan line GCL2, the second write scan line GWL2, the second black scan line GBL2, and the second emission control line EML2. However, the number of scan lines connected to each of the pixel PX and the number of emission control lines connected to each of the pixel PX are not limited thereto. For example, the number of scan lines and the number of emission control lines may be varied.

In an embodiment, each of the plurality of pixels PX includes a light emitting element ED (see FIG. 2A) and a pixel circuit unit PXC (see FIG. 2A) for controlling the emission of the light emitting element ED. The pixel circuit unit PXC may include one or more transistors and one or more capacitors. Through the same process as transistors of the pixel circuit unit PXC, the scan driver 300 and the light emitting driver 350 may be formed directly in the non-display area NDA of the display panel DP.

In an embodiment, each of the plurality of pixels PX receives the first driving voltage ELVDD, the second driving voltage ELVSS, the initialization voltage VINT, and the anode initialization voltage AINT from the voltage generator 400. Alternatively, each of the plurality of pixels PX may further receive the reference voltage Vref (See FIG. 2B) from the voltage generator 400.

Figure 2A:
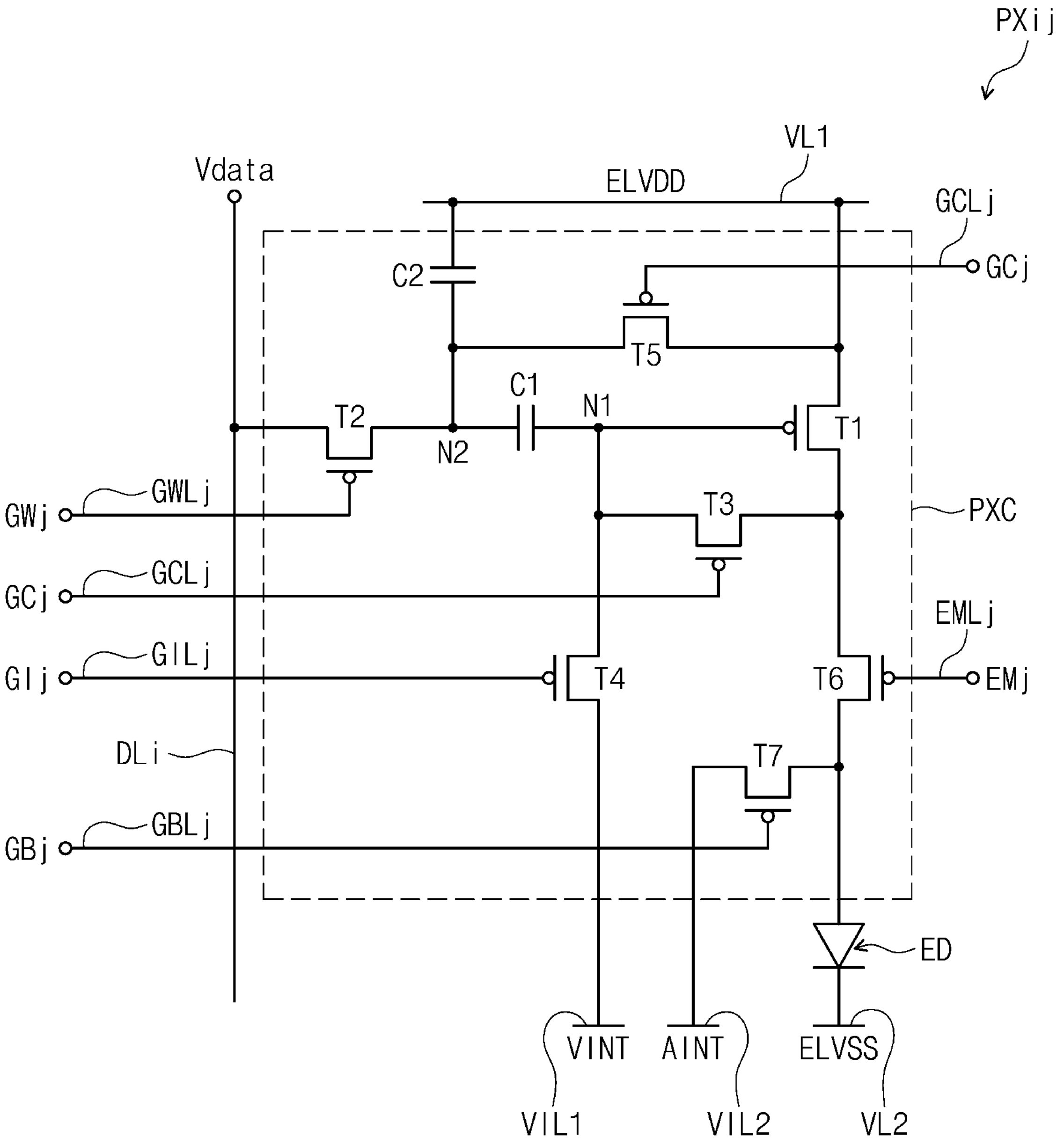
FIG. 2A is a circuit diagram of a pixel, according to an embodiment.
Figure 2B:
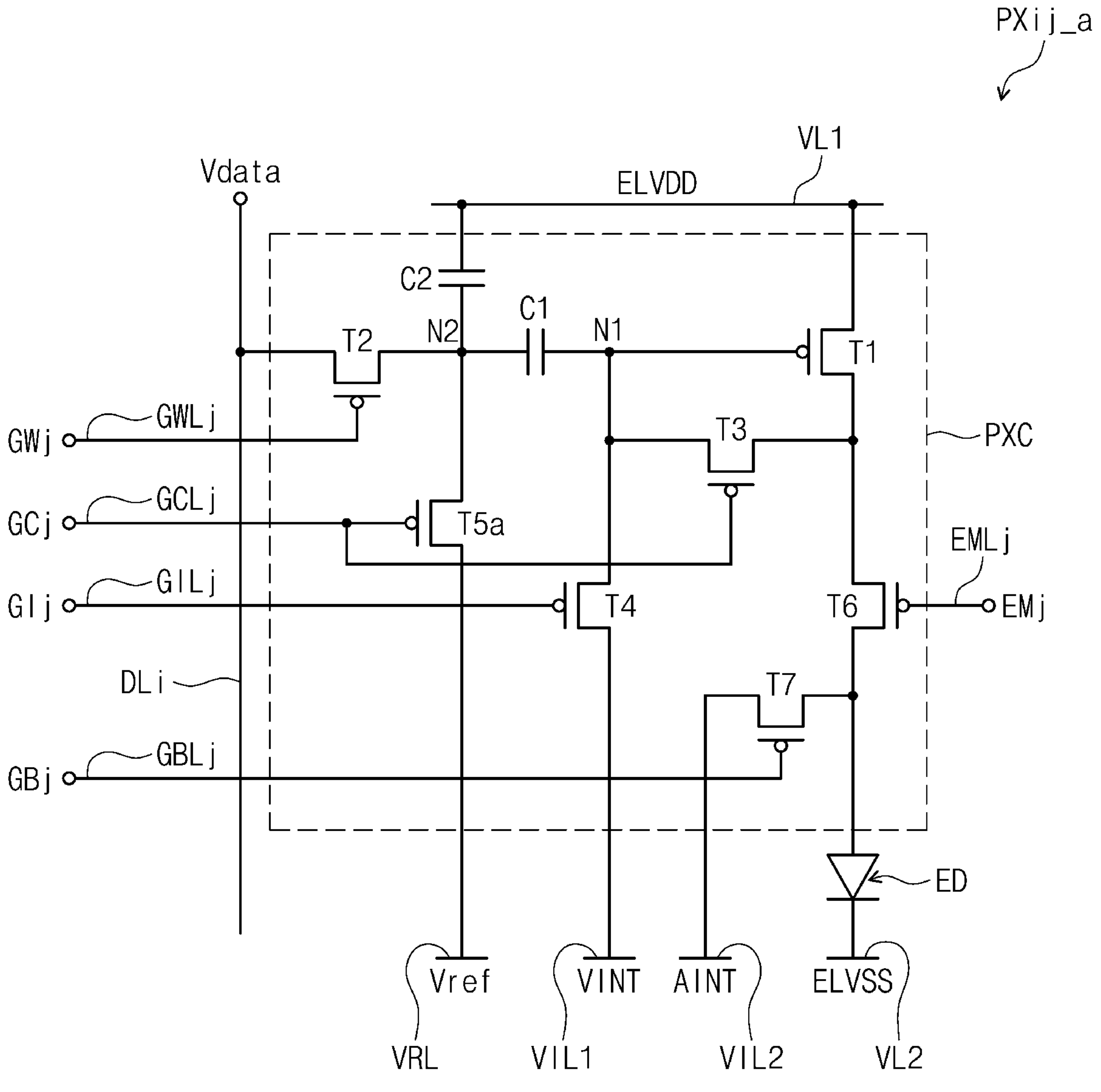
FIG. 2B is a circuit diagram of a pixel, according to an embodiment.

FIGS. 2A and 2B are schematic circuit diagrams of a pixel, according to an embodiment. In an embodiment, the pixels PX shown in FIG. 1 may have the same configuration as each other. Accordingly, in FIGS. 2A and 2B, a configuration of one pixel PXij or PXij_a among the pixels PX is described, and configurations of the other pixels are omitted to avoid redundancy.

In an embodiment and referring to FIG. 2A, the pixel PXij is connected to the j-th initialization scan line GILj among the initialization scan lines GIL1 to GILn, the j-th compensation scan line GCLj among the compensation scan lines GCL1 to GCLn, the j-th write scan line GWLj among the write scan lines GWL1 to GWLn, and the j-th black scan line GBLj among the black scan lines GBL1 to GBLn. Moreover, the pixel PXij is connected to the i-th data line DLi among the data lines DL1 to DLm shown in FIG. 1, and is connected to the j-th emission control line EMLj among the emission control lines EML1 to EMLn.

Referring to FIG. 2A, the pixel PXij according to an embodiment includes the pixel circuit unit PXC and the light emitting element ED. In an embodiment, the pixel circuit unit PXC may include seven transistors and two capacitors. Hereinafter, the seven transistors are respectively referred to as "first to seventh transistors T1, T2, T3, T4, T5, T6, and T7", respectively. The two capacitors are referred to as "first and second capacitors C1 and C2", respectively.

In an embodiment, each of the first to seventh transistors T1 to T7, respectively, is a P-type transistor having a low-temperature polycrystalline silicon (LTPS) semiconductor layer. Alternatively, each of the first to seventh transistors T1 to T7, respectively, may be an N-type transistor. Moreover, at least one of the first to seventh transistors T1 to T7, respectively, may be an N-type transistor and the others thereof may be P-type transistors. Alternatively, at least one of the first to seventh transistors T1 to T7, respectively, may be a transistor having an oxide semiconductor layer. For example, some of the first to seventh transistors T1 to T7, respectively, may be oxide semiconductor transistors, and others thereof may be LTPS transistors.

A circuit configuration of the pixel PXij according to an embodiment is not limited to the circuit configuration shown in FIG. 2A. The pixel PXij illustrated in FIG. 2A is only an example, and the circuit configuration of the pixel PXij may be modified and implemented.

In an embodiment, the j-th initialization scan line GILj supplies a j-th initialization scan signal GIj to the pixel PXij. The j-th write scan line GWLj supplies a j-th write scan signal GWj to the pixel PXij, and the j-th compensation scan line GCLj supplies a j-th compensation scan signal GCj to the pixel PXij. The j-th emission control line EMLj supplies the j-th emission control signal EMj to the pixel PXij, and the i-th data line DLi transmits an i-th data voltage Vdata to the pixel PXij. The i-th data voltage Vdata may have a voltage level corresponding to the image data DATA input to the display device DD (see FIG. 1).

In an embodiment, the pixel PXij may be connected to a first voltage line VL1, a second voltage line VL2, an initialization voltage line VIL1, and an anode initialization voltage line VIL2. The first voltage line VL1 transmits the first driving voltage ELVDD supplied from the voltage generator 400 shown in FIG. 1 to the pixel PXij. The second voltage line VL2 transmits the second driving voltage ELVSS supplied from the voltage generator 400 to the pixel PXij. The initialization voltage line VIL1 and the anode initialization voltage line VIL2 receives the initialization voltage VINT and the anode initialization voltage AINT, respectively, from the voltage generator 400 and transmits the initialization voltage VINT and the anode initialization voltage AINT to the pixel PXij.

In an embodiment, each of the first to seventh transistors T1 to T7, respectively, may include an input electrode (or source electrode), an output electrode (or drain electrode), and a control electrode (or gate electrode). In the present disclosure, for convenience of description, the input electrode, the output electrode, and the control electrode may be referred to as a "first electrode", a "second electrode", and a "third electrode", respectively.

In an embodiment, the first transistor T1 (or referred to as a "driving transistor") may be provided between the first voltage line VL1 and the light emitting element ED. In detail, the first transistor T1 includes a first electrode electrically connected to the first voltage line VL1, a second electrode electrically connected to the light emitting element ED, and a third electrode connected to a first node N1. The first transistor T1 may receive the first driving voltage ELVDD through the first voltage line VL1. The second electrode of the first transistor T1 may be electrically connected to the anode of the light emitting element ED via the sixth transistor T6.

In an embodiment, the second transistor T2 may be connected between the i-th data line DLi and a second node N2. In detail, the second transistor T2 includes a first electrode connected to the i-th data line DLi, a second electrode connected to the second node N2, and a third electrode for receiving the j-th write scan signal GWj through the j-th write scan line GWLj. During a data write period, the second transistor T2 is turned on in response to the j-th write scan signal GWj provided to the j-th write scan line GWLj. The i-th data line DLi and the second node N2 may be electrically connected by the turned-on second transistor T2. The i-th data voltage Vdata applied to the i-th data line DLi may be applied to the second node N2 through the turned-on second transistor T2.

In an embodiment, the first capacitor C1 is connected between the first node N1 and the second node N2, and the second capacitor C2 is connected between the second node N2 and the first voltage line VL1. The first capacitor C1 includes a first electrode electrically connected to the first node N1 and a second electrode electrically connected to the second node N2. The second capacitor C2 includes a first electrode electrically connected to the first voltage line VL1 and a second electrode electrically connected to the second node N2.

In an embodiment, the third transistor T3 is connected between the second electrode of the first transistor T1 and the third electrode of the first transistor T1. In detail, the third transistor T3 includes a first electrode electrically connected to the second electrode of the first transistor T1, a second electrode electrically connected to the first node N1, and a third electrode for receiving the j-th compensation scan signal GCj through the j-th compensation scan line GCLj. During a compensation period, the third transistor T3 is turned on in response to the j-th compensation scan signal GCj provided to the j-th compensation scan line GCLj. During the compensation period, the first transistor T1 may be diode-connected by the third transistor T3 turned on.

In an embodiment, the fourth transistor T4 is electrically connected between the first node N1 and the initialization voltage line VIL1. In detail, the fourth transistor T4 includes a first electrode electrically connected to the first node N1, a second electrode electrically connected to the initialization voltage line VIL1, and a third electrode for receiving the j-th initialization scan signal GIj through the j-th initialization scan line GILj. The initialization voltage VINT may be applied to the initialization voltage line VIL1. During an initialization period, the fourth transistor T4 is turned on in response to the j-th initialization scan signal GIj provided to the j-th initialization scan line GILj. During the initialization period, the first node N1 may be initialized to the initialization voltage VINT by the fourth transistor T4 turned on.

In an embodiment, the fifth transistor T5 may be electrically connected between the second node N2 and the first voltage line VL1. The fifth transistor T5 includes a first electrode connected to the first voltage line VL1, a second electrode electrically connected to the second node N2, and a third electrode for receiving the j-th compensation scan signal GCj through the j-th compensation scan line GCLj. During the compensation period, the fifth transistor T5 is turned on in response to the j-th compensation scan signal GCj provided to the j-th compensation scan line GCLj. The first voltage line VL1 and the second node N2 are electrically connected by the turned-on fifth transistor T5. That is, during the compensation period, the first driving voltage ELVDD may be applied to the second node N2.

In an embodiment, the third electrodes of the third and fifth transistors T3 and T5, respectively, are commonly connected to the j-th compensation scan line GCLj, but the invention is not limited thereto. That is, the third electrode of the third transistor T3 and the third electrode of the fifth transistor T5 are connected to different scan lines to receive different scan signals.

In an embodiment, the sixth transistor T6 (or referred to as an "emission control transistor") is connected between the second electrode of the first transistor T1 and the anode of the light emitting element ED. In detail, the sixth transistor T6 includes a first electrode connected to the second electrode of the first transistor T1, a second electrode electrically connected to the anode of the light emitting element ED, and a third electrode electrically connected to the j-th emission control line EMLj. During an emission period, the sixth transistor T6 may be turned on in response to the j-th emission control signal EMj provided to the j-th emission control line EMLj.

In an embodiment, the seventh transistor T7 (or referred to as an "anode initialization transistor") is connected between the anode initialization voltage line VIL2 and the anode of the light emitting element ED. The seventh transistor T7 includes a first electrode connected to the anode of the light emitting element ED, a second electrode connected to the anode initialization voltage line VIL2, and a third electrode that receives the j-th black scan signal GBj (or referred to as an "initialization control signal") through the j-th black scan line GBLj. The anode initialization voltage AINT may be applied to the anode initialization voltage line VIL2. In an embodiment, the anode initialization voltage AINT has a different voltage level from the voltage level of the initialization voltage VINT. During a black period, the seventh transistor T7 is turned on in response to the j-th black scan signal GBj provided through the j-th black scan line GBLj. During the black period, the anode of the light emitting element ED may be initialized to the anode initialization voltage AINT by the seventh transistor T7 thus turned on. Alternatively, the third electrode of the seventh transistor T7 may be connected to a (j+1)-th write scan line to receive a (j+1)-th write scan signal as the j-th black scan signal GBj.

In an embodiment, the light emitting element ED may be electrically connected between the sixth transistor T6 and the second voltage line VL2. The anode of the light emitting element ED is connected to the second electrode of the sixth transistor T6, and a cathode of the light emitting element ED is connected to the second voltage line VL2. The second driving voltage ELVSS may be applied to the second voltage line VL2. The second driving voltage ELVSS has a lower level than the first driving voltage ELVDD. Accordingly, the light emitting element ED may emit light in response to a voltage corresponding to a difference between the signal transmitted through the sixth transistor T6 and the second driving voltage ELVSS.

Referring to FIG. 2B, in a pixel PXij_a according to an embodiment, a fifth transistor T5*a* may be electrically connected between the second node N2 and a reference voltage line VRL. The reference voltage line VRL may receive a reference voltage Vref from the voltage generator 400 shown in FIG. 1 to supply the reference voltage Vref to the pixel PXij_a. The reference voltage Vref may have a lower voltage level than that of the first driving voltage ELVDD. The fifth transistor T5*a* includes a first electrode connected to the reference voltage line VRL, a second electrode electrically connected to the second node N2, and a third electrode receiving the j-th compensation scan signal GCj through the j-th compensation scan line GCLj. During the compensation period, the fifth transistor T5*a* is turned on in response to the j-th compensation scan signal GCj provided to the j-th compensation scan line GCLj. The reference voltage line VRL and the second node N2 are electrically connected by the turned-on fifth transistor T5*a*. That is, the reference voltage Vref may be applied to the second node N2 during the compensation period.

Figure 2C:
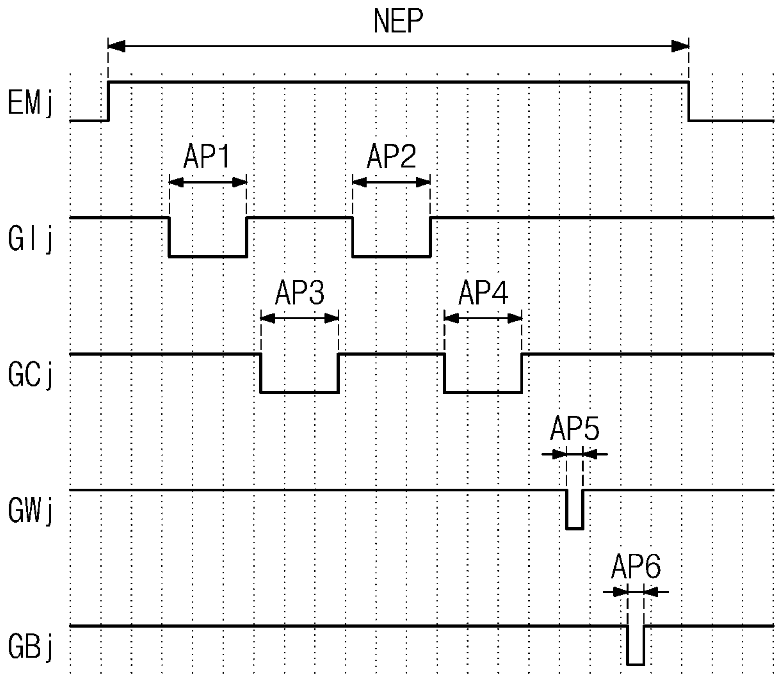
FIG. 2C is a timing diagram for describing an operation of a pixel, according to an embodiment.

FIG. 2C is a timing diagram for describing an operation of a pixel, according to an embodiment.

In an embodiment, FIG. 2C shows only the j-th scan signals GIj, GCj, GWj, and GBj and the j-th emission control signal EMj. However, the other scan signals and the other emission control signals operate in the similar manner, and thus a detailed description thereof will be omitted to avoid redundancy.

In an embodiment and referring to FIGS. 2A and 2C, during a non-emission period NEP, the j-th initialization scan signal GIj among the j-th scan signals GIj, GCj, GWj, and GBj may be generated to have first and second active periods AP1 and AP2 (i.e., a low-level period). The non-emission period NEP may be defined as an inactive period (i.e., a high-level period) of the j-th emission control signal EMj.

In an embodiment, the j-th initialization scan signal GIj is supplied to the fourth transistor T4 through the j-th initialization scan line GILj, and the fourth transistor T4 is turned on during the first and second active periods AP1 and AP2 in each of which the j-th initialization scan signal GIj is activated. During the first and second active periods AP1 and AP2, the potential of the first node N1 may be initialized to the initialization voltage VINT by the fourth transistor T4 turned on. That is, the j-th initialization scan signal GIj includes the two active periods AP1 and AP2, and thus the first node N1 may be initialized twice within the non-emission period NEP.

In an embodiment, during the non-emission period NEP, the j-th compensation scan signal GCj among the j-th scan signals GIj, GCj, GWj, and GBj may be generated to have third and fourth active periods AP3 and AP4.

In an embodiment, when the j-th compensation scan signal GCj is supplied to the third and fifth transistors T3 and T5, respectively, through the j-th compensation scan line GCLj, the third and fifth transistors T3 and T5, respectively, are turned on in the third and fourth active periods AP3 and AP4, respectively. The first transistor T1 is diode-connected by the third transistor T3 to be turned on and is forward-biased. Then, a compensation voltage ("ELVDD-Vth") obtained by reducing the first driving voltage ELVDD by a threshold voltage Vth of the first transistor T1 may be applied to the first node N1. That is, in the third and fourth active periods AP3 and AP4, respectively, the potential of the first node N1 may be compensated to be the compensation voltage ("ELVDD-Vth"). During the third and fourth active periods AP3 and AP4, respectively, the first driving voltage ELVDD is applied to the second node N2 through the turned-on fifth transistor T5.

In an embodiment, the duration of each of the third and fourth active periods AP3 and AP4, respectively, may be the same as the duration of each of the first and second active periods AP1 and AP2, respectively.

In an embodiment, among the j-th scan signals GIj, GCj, GWj, and GBj, the j-th write scan signal GWj may be generated to have a fifth active period AP5 during the non-emission period NEP, and the j-th black scan signal GBj may be generated to have a sixth active period AP6 during the non-emission period NEP.

In an embodiment, the j-th write scan signal GWj is supplied to the second transistor T2 through the j-th write scan line GWLj, and then the second transistor T2 is turned on during a fifth active period AP5. The i-th data voltage Vdata may be applied to the second node N2 through the turned-on second transistor T2. Then, the potential of the second node N2 changes from the first driving voltage ELVDD to the i-th data voltage Vdata. The potential of the first node N1 is also changed by the coupling of the first capacitor C1.

In an embodiment, the j-th black scan signal GBj is supplied to the seventh transistor T7 through the j-th black scan line GBLj, and then the seventh transistor T7 is turned on during the sixth active period AP6. During the sixth active period AP6, the anode initialization voltage AINT may be applied to the anode of the light emitting element ED through the turned-on seventh transistor T7. Then, the anode of the light emitting element ED may be initialized to the anode initialization voltage AINT.

In an embodiment, the fifth active period AP5 and the sixth active period AP6 may have the same duration as each other. Besides, the duration of each of the first to fourth active periods AP1 to AP4, respectively, may be greater than or equal to the duration of each of the fifth and sixth active periods AP5 and AP6, respectively. FIG. 2C illustrate that the duration of each of the first to fourth active periods AP1 to AP4, respectively, is three times greater than the duration of each of the fifth and sixth active periods AP5 and AP6, respectively, but the invention is not limited to thereto. Alternatively, the duration of each of the first to fourth active periods AP1 to AP4, respectively, may be twice or four times greater than the duration of each of the fifth and sixth active periods AP5 and AP6, respectively.

Figure 3A:
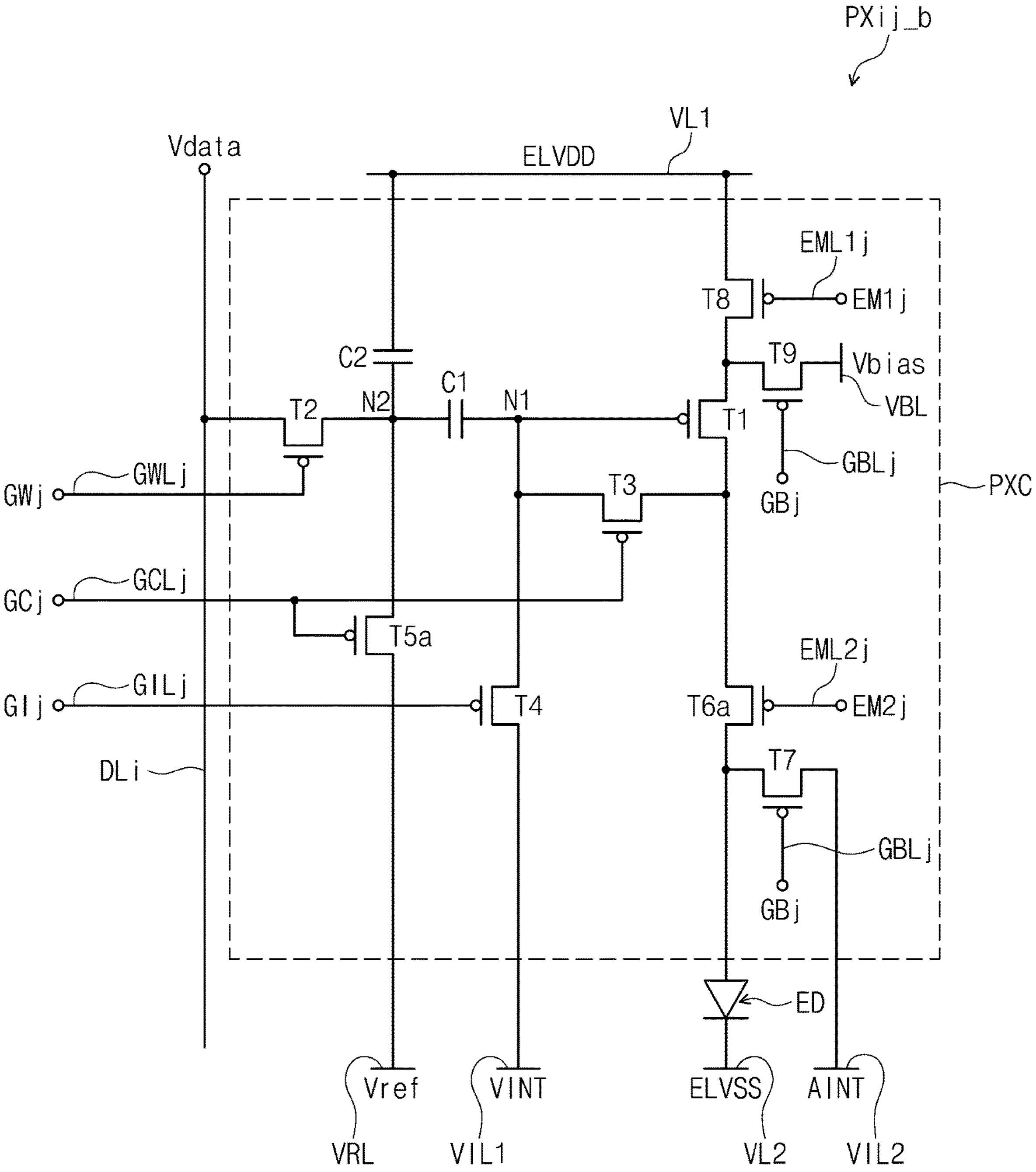
FIG. 3A is a circuit diagram of a pixel, according to an embodiment.
Figure 3B:
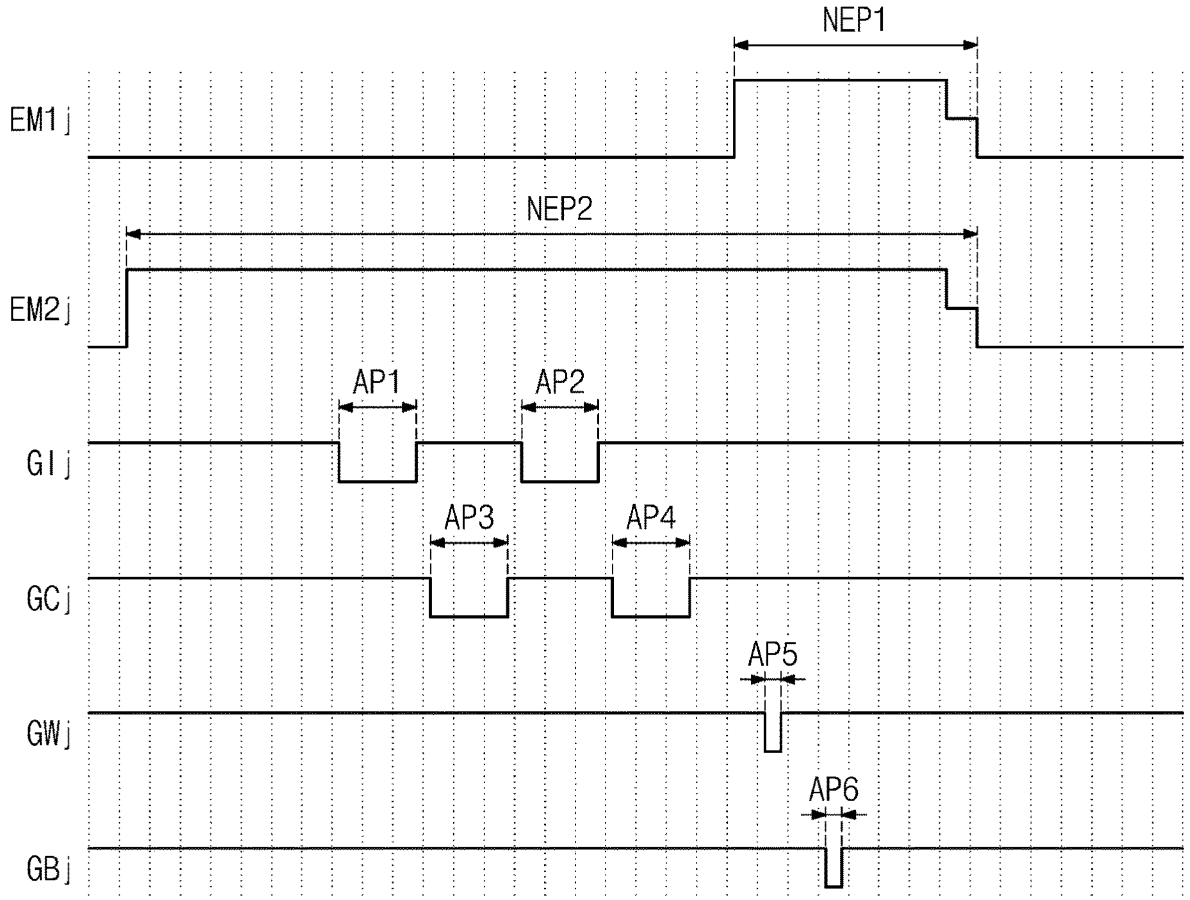
FIG. 3B is a timing diagram for describing an operation of a pixel, according to an embodiment.

FIG. 3A is a schematic circuit diagram of a pixel, according to an embodiment. FIG. 3B is a timing diagram for describing an operation of a pixel, according to an embodiment. However, the same reference numerals are given to the same components as those shown in FIGS. 2A and 2B among the components shown in FIGS. 3A and 3B, and thus a detailed description thereof will be omitted to avoid redundancy.

Referring to FIG. 3A, the pixel PXij_b according to an embodiment includes the pixel circuit unit PXC and the light emitting element ED. In an embodiment, the pixel circuit unit PXC may include nine transistors and two capacitors. Hereinafter, the nine transistors are respectively referred to as "first to ninth transistors T1, T2, T3, T4, T5*a*, T6*a*, T7, T8, and T9", respectively. The two capacitors are referred to as "first and second capacitors C1 and C2", respectively.

In an embodiment, the pixel PXij_b may be connected to the first voltage line VL1, the second voltage line VL2, the initialization voltage line VIL1, the anode initialization voltage line VIL2, the reference voltage line VRL, and a bias voltage line VBL. The bias voltage line VBL receives a bias voltage Vbias from the voltage generator 400 (see FIG. 1) and transmits the bias voltage Vbias to the pixel PXij_b.

In an embodiment, the eighth transistor T8 may be electrically connected between the first transistor T1 and the first voltage line VL1. In detail, the eighth transistor T8 includes a first electrode electrically connected to the first voltage line VL1, a second electrode electrically connected to the first electrode of the first transistor T1, and a third electrode for receiving a j-th first emission control signal EM1*j* through a j-th first emission control line EML1*j*. During a first emission period, the eighth transistor T8 may be turned on in response to the j-th first emission control signal EM1*j* provided through the j-th first emission control line EML1*j*.

In an embodiment, the ninth transistor T9 may be electrically connected between the first transistor T1 and the bias voltage line VBL. In detail, the ninth transistor T9 includes a first electrode electrically connected to the bias voltage line VBL, a second electrode electrically connected to the first electrode of the first transistor T1, and a third electrode for receiving the j-th black scan signal GBj through the j-th black scan line GBLj. During a black period, the ninth transistor T9 is turned on in response to the j-th black scan signal GBj provided through the j-th black scan line GBLj. During the black period, the bias voltage Vbias may be applied to the first electrode of the first transistor T1 through the turned-on ninth transistor T9.

In an embodiment, the sixth transistor T6*a* is connected between the second electrode of the first transistor T1 and the anode of the light emitting element ED. In detail, the sixth transistor T6*a* includes a first electrode connected to the second electrode of the first transistor T1, a second electrode electrically connected to the anode of the light emitting element ED, and a third electrode electrically connected to the j-th second emission control line EML2*j*. During a second emission period, the sixth transistor T6*a* may be turned on in response to the j-th second emission control signal EM2*j* provided through the j-th second emission control line EML2*j*.

In an embodiment and referring to FIGS. 3A and 3B, the j-th first emission control signal EM1*j* includes a first non-emission period NEP1. The j-th second emission control signal EM2*j* includes a second non-emission period NEP2. In an embodiment, the first and second non-emission periods NEP1 and NEP2 may overlap each other. The duration of the second non-emission period NEP2 may be greater than the duration of the first non-emission period NEP1. The first non-emission period NEP1 may be defined as an inactive period (i.e., a high-level period) of the j-th first emission control signal EM1*j*. The second non-emission period NEP2 may be defined as an inactive period (i.e., a high-level period) of the j-th second emission control signal EM2*j*.

In an embodiment, during the second non-emission period NEP2, the j-th initialization scan signal GIj may be generated to have the first and second active periods AP1 and AP2 (i.e., low-level periods), respectively. During the second non-emission period NEP2, the j-th compensation scan signal GCj may be generated to have the third and fourth active periods AP3 and AP4 (i.e., low-level periods), respectively.

In an embodiment, during the second non-emission period NEP2, the j-th write scan signal GWj may be generated to have the fifth active period AP5. During the second non-emission period NEP2, the j-th black scan signal GBj may be generated to have the sixth active period AP6. The fifth and sixth active periods AP5 and AP6, respectively, may overlap the first non-emission period NEP1.

Figure 4A:
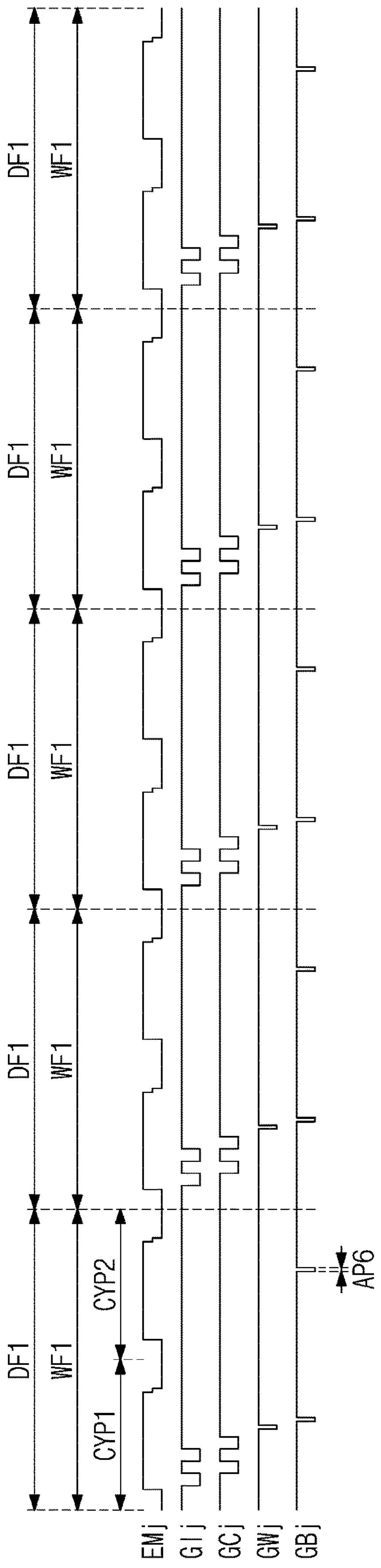
FIG. 4A is a timing diagram for describing a display device operating at a first operating frequency in a variable frequency mode, according to an embodiment.
Figure 4B:
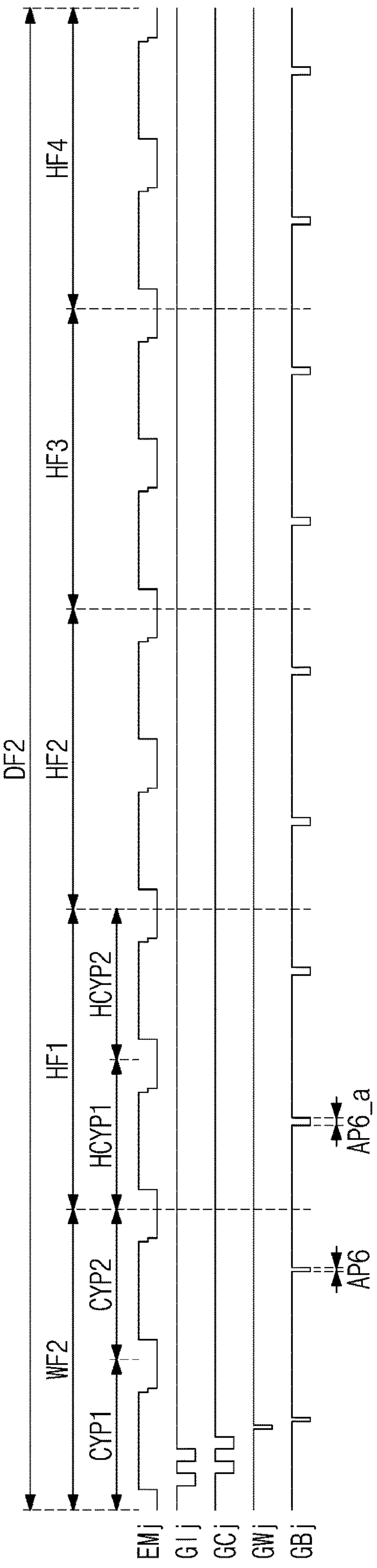
FIG. 4B is a timing diagram for describing a display device operating at a second operating frequency in a variable frequency mode, according to an embodiment.

FIG. 4A is a timing diagram for describing a display device operating at a first operating frequency in a variable frequency mode, according to an embodiment. FIG. 4B is a timing diagram for describing a display device operating at a second operating frequency in a variable frequency mode, according to an embodiment.

In an embodiment and referring to FIGS. 1 and 4A, the display device DD may operate in a normal frequency mode (or a first mode) in which an operating frequency is fixed (i.e., not variable) and/or in a variable frequency mode (or a second mode) in which the operating frequency is variable. In the variable frequency mode, the operating frequency may be varied according to a frame rate. FIG. 4A shows that the display device DD operates at a first operating frequency in the variable frequency mode. FIG. 4B shows that the display device DD operates at a second operating frequency in the variable frequency mode. In an embodiment, the first operating frequency may be the highest operating frequency at which the display device DD is capable of operating. For example, the first operating frequency may be 240 Hz or 480 Hz. The first operating frequency may be referred to as a "reference frequency" or "maximum frequency". The second operating frequency may be lower than the first operating frequency. In an embodiment, the second operating frequency may be a frequency corresponding to one of predetermined compensation frequencies in the panel driver PDD (e.g. the driving controller 100).

In an embodiment and as shown in FIGS. 1 and 4A, when the display device DD operates at the first operating frequency in the variable frequency mode, the scan signals GIj, GCj, GWj, and GBj and the emission control signals EMj may be activated within a first driving frame DF1. In an embodiment, an active period in which the scan signals GIj, GCj, GWj, and GBj and the emission control signal EMj are activated may be defined as a low-level period. An inactive period in which the scan signals GIj, GCj, GWj, and GBj and the emission control signal EMj are deactivated may be defined as a high-level period. In an embodiment, the first driving frame DF1 may include a first write frame WF1. The first write frame WF1 may include a first cycle period CYP1 and a second cycle period CYP2.

In an embodiment, some GIj, GCj, and GWj of the scan signals GIj, GCj, GWj, and GBj are activated within only the first cycle period CYP1, and may remain in an inactive state within the second cycle period CYP2. The black scan signal GBj and the emission control signal EMj may be activated within the first and second cycle periods CYP1 and CYP2. The initialization scan signal GIj, the compensation scan signal GCj, and the write scan signal GWj may be activated within only the first cycle period CYP1. That is, the black scan signal GBj and the emission control signal EMj are activated in units of one cycle period. The initialization, compensation, and write scan signals GIj, GCj, and GWj are activated in units of one write frame. Accordingly, frequencies of the black scan signal GBj and the emission control signal EMj may be greater than frequencies of the initialization, compensation, and write scan signals GIj, GCj, and GWj.

In an embodiment and as shown in FIGS. 1 and 4B, in the variable frequency mode, the display device DD may operate at the second operating frequency different from the first operating frequency. In an embodiment, the second operating frequency may be lower than the first operating frequency. For example, the second operating frequency may be about 48 Hz or about 96 Hz. When the display device DD operates at the second operating frequency, the scan signals GIj, GCj, GWj, and GBj and the emission control signals EMj may be activated within the second driving frame DF2.

In an embodiment, the second driving frame DF2 may include a second write frame WF2 and a plurality of holding frames HF1, HF2, HF3, and HF4. The duration of the second write frame WF2 may be the same as the duration of the first write frame WF1. The duration of each of the plurality of holding frames HF1, HF2, HF3, and HF4 may be the same as the duration of the second write frame WF2. The number of holding frames HF1, HF2, HF3, and HF4 included in the second driving frame DF2 may vary depending on the second operating frequency.

In an embodiment, some GIj, GCj, and GWj of the scan signals GIj, GCj, GWj, and GBj may be activated within only the second write frame WF2 and may maintain an inactive state within the holding frames HF1, HF2, HF3, and HF4. The second write frame WF2 may include the first cycle period CYP1 and the second cycle period CYP2. Each of the holding frames HF1, HF2, HF3, and HF4 may include a first holding cycle period HCYP1 and a second holding cycle period HCYP2. In an embodiment, each of the first and second holding cycle periods HCYP1 and HCYP2 may have the same duration as each of the first and second cycle periods CYP1 and CYP2.

In an embodiment, some GIj, GCj, and GWj among the scan signals GIj, GCj, GWj, and GBj may be activated within only the first cycle period CYP1 of the second write frame WF2 and may remain in an inactive state within the second cycle period CYP2. The black scan signal GBj and the emission control signal EMj may be activated within the second write frame WF2 and the holding frames HF1, HF2, HF3, and HF4. That is, the black scan signal GBj and the emission control signal EMj are activated in units of one cycle period. The frequencies of the black scan signal GBj and the emission control signal EMj are activated in units of one write frame. Accordingly, frequencies of the black scan signal GBj and the emission control signal EMj may be greater than frequencies of the initialization, compensation, and write scan signals GIj, GCj, and GWj.

In an embodiment, the driving controller 100 may determine whether the second operating frequency corresponds to one of predetermined compensation frequencies, and may adjust a duty ratio of the black scan signal GBj depending on the determination result. In detail, when the second operating frequency corresponds to one of the predetermined compensation frequencies, the driving controller 100 may vary a duty ratio of the black scan signal GBj after a specific time point (e.g., after the start time of the first holding frame HF1) of the second driving frame.

In an embodiment, in the second write frame WF2, the duty ratio of the black scan signal GBj may be different from the duty ratio of the black scan signal GBj in the holding frames HF1, HF2, HF3, and HF4. During the second write frame WF2, the active period AP6 of the black scan signal GBj may have a first duration. During the holding frames HF1, HF2, HF3, and HF4, the active period AP6_*a* of the black scan signal GBj may have a second duration different from the first duration. In an embodiment, the second duration may be greater than the first duration. FIG. 4B illustrates that the second duration is greater than the first duration, but the present invention is not limited thereto. For example, the second duration may be smaller than the first duration. Also, as an example, the second duration may be greater than one time the first duration, and may be less than two times the first duration. However, the present invention is not limited thereto. For example, the second duration may be greater than two times the first duration.

In an embodiment, when the first holding frame HF1 is started, the duty ratio of the black scan signal GBj may be adjusted from the start time of the first holding frame HF1. However, the present invention is not limited thereto. The duty ratio of the black scan signal GBj may be adjusted from the start time of the second or third holding frame HF2 or HF3, respectively, or may be adjusted from the start time of the second holding cycle period HCYP2 of the first holding frame HF1.

Figure 5A:
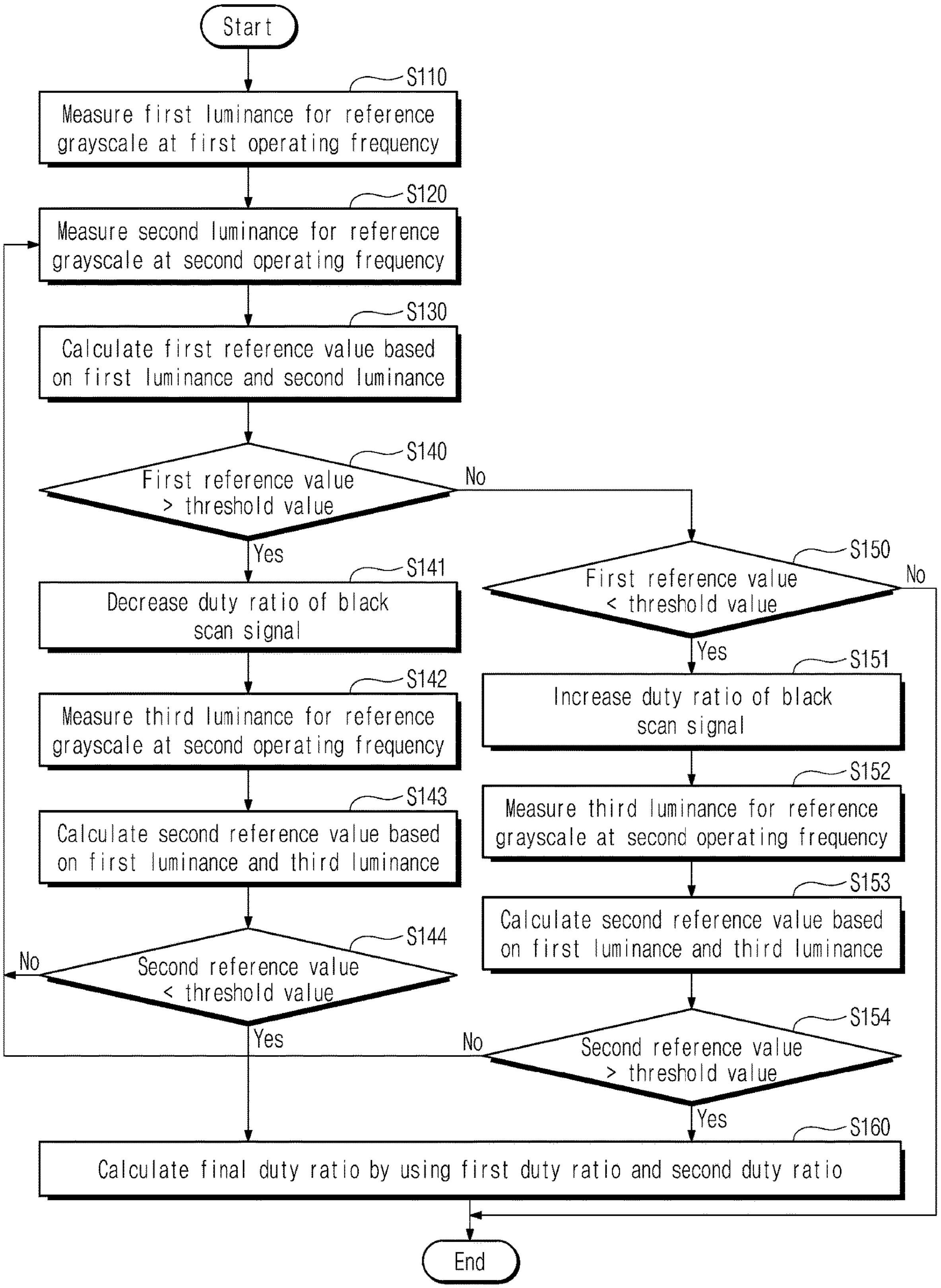
FIG. 5A is a flowchart illustrating a luminance compensation method of a display device, according to an embodiment.
Figure 5B:
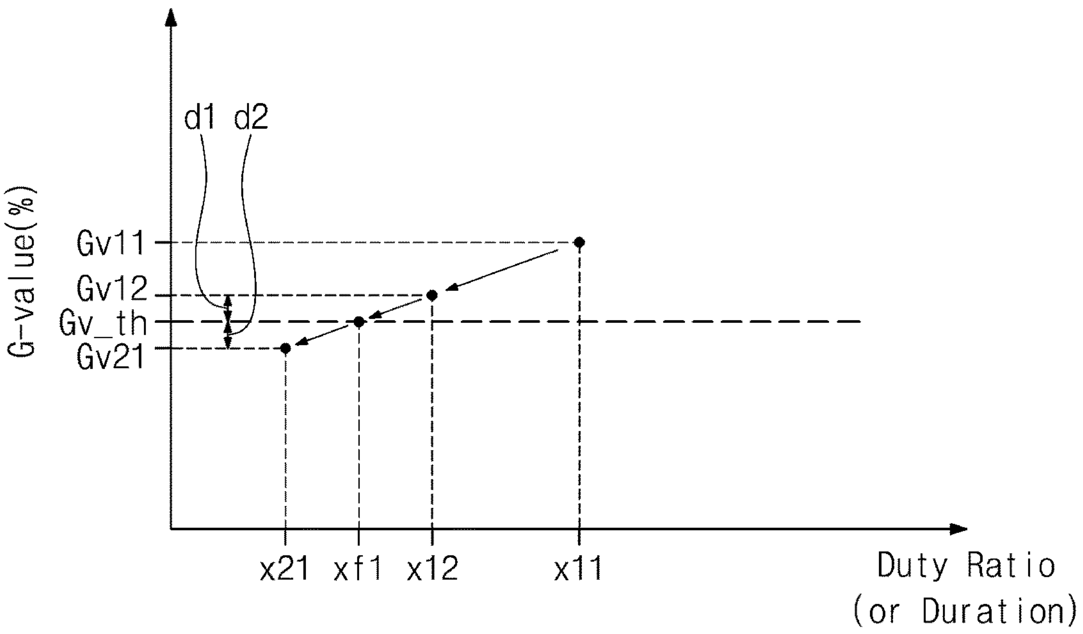
FIG. 5B is a graph for describing a method of setting a duty ratio of a black scan signal, according to an embodiment.
Figure 5C:
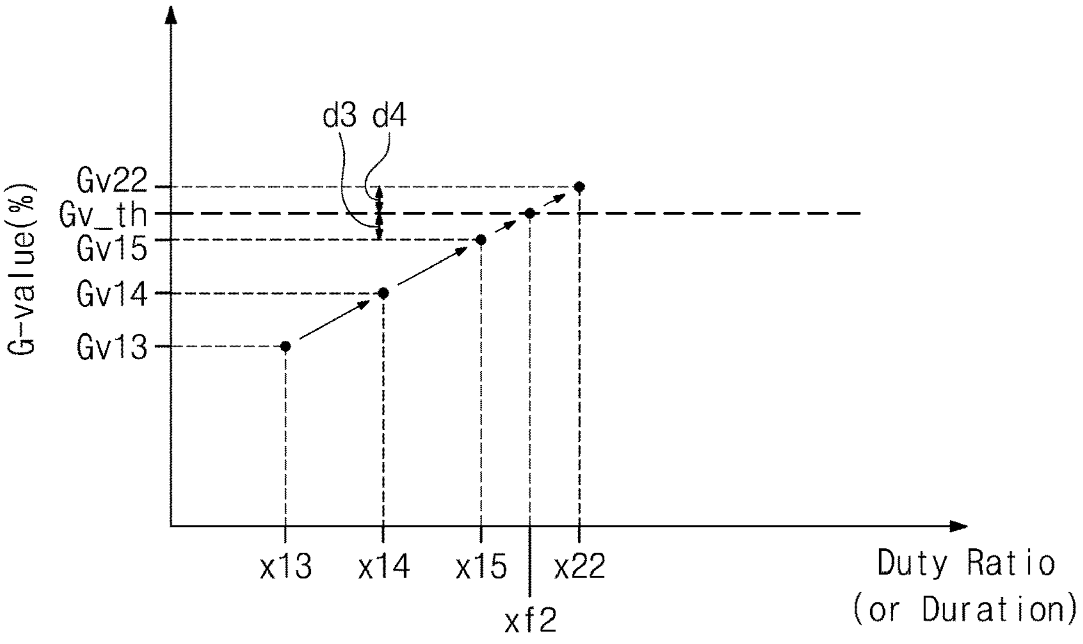
FIG. 5C is a graph for describing a method of setting a duty ratio of a black scan signal, according to an embodiment.

FIG. 5A is a flowchart illustrating a luminance compensation method of a display device, according to an embodiment. FIGS. 5B and 5C are diagrams for describing a method of setting a duty ratio of a black scan signal, according to embodiments.

Referring to FIG. 5A, a luminance compensation device (or tuning device) of a display device according to an embodiment may perform the following luminance compensation process (or tuning process). When initiating a luminance compensation operation (or tuning operation), the luminance compensation device may first measure first luminance for a predetermined reference grayscale at a first operating frequency (S110).

In an embodiment, the first operating frequency may be referred to as a reference frequency, a maximum frequency, or a high frequency. In an embodiment, in the case of a display device that represents one of low grayscales (e.g., 0 to 255 grayscales), the reference grayscale may be set to 11 grayscale or 23 grayscale.

Next, in an embodiment, the luminance compensation device may measure second luminance for the reference grayscale at a second operating frequency different from the first operating frequency (S120). The second operating frequency may be a frequency lower than the first operating frequency. The second operating frequency may be referred to as a low frequency. In an embodiment, the first operating frequency may be about 240 Hz or about 480 Hz, and the second operating frequency may be about 48 Hz or about 30 Hz.

In an embodiment, the luminance compensation device may calculate a first reference value Gv11 based on the first luminance and the second luminance (S130). In particular, the first reference value Gv11 may be generated based on a difference value between the first luminance and the second luminance. The luminance compensation device may compare the first reference value Gv11 with a predetermined threshold value Gv_th and may change a duty ratio (or referred to as an "initial duty ratio x11") of the black scan signal GBj (or referred to as an "initialization control signal") to a first duty ratio x12 depending on the first comparison result (S140). In an embodiment, the threshold value Gv_th may be set as a reference value calculated when a difference value between the first luminance and the second luminance is 0.

In an embodiment and referring to FIGS. 5A and 5B, when the first reference value Gv11 is greater than the threshold value Gv_th, the luminance compensation device may generate the first duty ratio x12 by reducing the initial duty ratio x11 (S141). Afterward, the luminance compensation device may repeat the same process on the first duty ratio x12. That is, when the first reference value Gv12 measured when the black scan signal GBj has the first duty ratio x12 is greater than the threshold value Gv_th, the duration of the active period AP6_*a* of the black scan signal GBj may decrease by a predetermined change amount. That is, when the first reference value Gv12 for the first duty ratio x12 is greater than the threshold value Gv_th, the luminance compensation device may reduce the first duty ratio x12 and then may generate a second duty ratio x21.

In an embodiment, after the first duty ratio x12 is reduced to the second duty ratio x21, the luminance compensation device may measure third luminance for the reference grayscale at the second operating frequency (S142). Afterward, the luminance compensation device may calculate a second reference value Gv21 based on the first luminance and the third luminance (S143). In particular, the second reference value Gv21 may be generated based on a difference value between the first luminance and the third luminance. The luminance compensation device may compare the second reference value Gv21 and the predetermined threshold value Gv_th (S144). When the comparison result indicates that the second reference value Gv21 is not less than the threshold value Gv_th, a procedure may move to the step S120, and the luminance compensation device may repeat the step S120 to the step S144.

In an embodiment, when the comparison result (i.e., the second comparison result) indicates that the second reference value Gv21 is less than the threshold value Gv_th, the luminance compensation device may calculate a final duty ratio xf1 by using the first duty ratio (in particular, the previous duty ratio x12) and the second duty ratio (i.e., the current duty ratio x21) (S160). The final duty ratio xf1 may be a value between the first duty ratio x12 and the second duty ratio x21. The final duty ratio xf1 may be calculated based on Equation 1 below (i.e., a linear interpolation function) using the first duty ratio x12, the second duty ratio x21, a first difference value d1 between the first reference value Gv12 and the threshold value Gv_th, and a second difference value d2 between the second reference value Gv21 and the threshold value Gv_th.

$$xf1 = \frac{(x12 \times d2) + (x21 \times d1)}{(d1 + d2)}, \quad \text{[Equation 1]}$$

Here, x12 is a first duty ratio, and x21 is a second duty ratio. Moreover, in an embodiment, d1 is a first difference value between the first reference value Gv12 and the threshold value Gv_th, and d2 is a second difference value between the second reference value Gv21 and the threshold value Gv_th. Accordingly, the final duty ratio xf1 of the black scan signal GBj capable of outputting the threshold value Gv_th during an operation at the second operating frequency may be calculated based on Equation 1. The duration of the active period AP6_*a* (see FIG. 4B) of the black scan signal GBj may be set differently depending on the final duty ratio xf1.

Alternatively, in an embodiment, in Equation 1, the duration of the active period AP6_*a* (see FIG. 4B) corresponding to the first duty ratio x12 may be substituted instead of the first duty ratio x12, and the duration of the active period AP6_*a* corresponding to the second duty ratio x21 may be substituted instead of the second duty ratio x21. In this case, the final duration may be directly calculated instead of the final duty ratio xf1.

In an embodiment, when the second reference value Gv21 is equal to the threshold value Gv_th, the second difference value d2 may be 0, and thus the second duty ratio x21 may be calculated as the final duty ratio xf1.

In the meantime, in an embodiment and referring to FIGS. 5A and 5C, when a first reference value Gv13 is not greater than the threshold value Gv_th, the luminance compensation device may determine whether the first reference value Gv13 is less than the threshold value Gv_th (S150). When the first reference value Gv13 is less than the threshold value Gv_th, the luminance compensation device may generate a first duty ratio x14 by increasing a duty ratio (i.e., an initial duty ratio x13) (S151). That is, when the first reference value Gv13 is less than the threshold value Gv_th, the duration of the active period AP6_*a* (see FIG. 4B) of the black scan signal GBj may increase by a predetermined change amount.

In the meantime, In an embodiment, when the first reference value Gv13 is neither greater nor less than the threshold value Gv_th, the luminance compensation device may terminate luminance compensation operation. That is, this corresponds to a case where the first reference value Gv13 is equal to the threshold value Gv_th. Accordingly, in this case, there is no need to change a duty ratio (i.e., the initial duty ratio x13) of the black scan signal GBj, and thus the luminance compensation operation may be terminated immediately.

Afterward, in an embodiment, the luminance compensation device may repeat the same process on a first duty ratio x14 or x15. That is, when the first reference value Gv14 or Gv15 measured when the black scan signal GBj has the first duty ratio x14 or x15 is less than the threshold value Gv_th, the duration of the active period AP6_*a* of the black scan signal GBj may increase by a predetermined change amount. That is, when the first reference value Gv14 or Gv15 for the first duty ratio x14 or x15 is still less than the threshold value Gv_th, the luminance compensation device may increase the first duty ratio x15 and then may generate a second duty ratio x22.

In an embodiment, after the duty ratio is increased to the second duty ratio x22, the luminance compensation device may measure third luminance for a reference grayscale at the second operating frequency (S152). Afterward, the luminance compensation device may calculate a second reference value Gv22 based on the first luminance and the third luminance (S153). In particular, the second reference value Gv22 may be generated based on a difference value between the first luminance and the third luminance. The luminance compensation device may compare the second reference value Gv22 and the predetermined threshold value Gv_th (S154). When the comparison result indicates that the second reference value Gv22 is not greater than the threshold value Gv_th, a procedure may move to operation S120, and the luminance compensation device may repeat the process.

In an embodiment, when the comparison result (i.e., the second comparison result) indicates that the second reference value Gv22 is greater than the threshold value Gv_th, the luminance compensation device may calculate a final duty ratio xf2 by using the first duty ratio (i.e., the previous duty ratio x15) and the second duty ratio (i.e., the current duty ratio x22) (S160). The final duty ratio xf2 may be a value between the first duty ratio x15 and the second duty ratio x22. The final duty ratio xf2 may be calculated based on Equation 2 below.

$$xf2 = \frac{(x15 \times d4) + (x22 \times d3)}{(d3 + d4)}, \quad \text{[Equation 2]}$$

where x15 is a first duty ratio, and x22 is a second duty ratio. Moreover, in an embodiment, d3 is a first difference value between the first reference value Gv15 and the threshold value Gv_th, and d4 is a second difference value between the second reference value Gv22 and the threshold value Gv_th. Accordingly, the final duty ratio xf2 of the black scan signal GBj capable of outputting the threshold value Gv_th during an operation at the second operating frequency may be calculated based on Equation 2.

Alternatively, in an embodiment, in Equation 2, the duration of the active period AP6_*a* corresponding to the first duty ratio x15 may be substituted instead of the first duty ratio x15, and the duration of the active period AP6_*a* corresponding to the second duty ratio x22 may be substituted instead of the second duty ratio x22.

In the meantime, in an embodiment, when the second reference value Gv22 is equal to the threshold value Gv_th, the second difference value d4 may be 0, and thus the second duty ratio x22 may be calculated as the final duty ratio xf2.

As such, in an embodiment, when the display device DD operates at the second operating frequency through a luminance compensation operation (i.e., a tuning operation), the luminance compensation device may set the black scan signal GBj to have a final duty ratio xf1 or xf2. Accordingly, because a luminance difference between high-frequency driving and low-frequency driving is small or there is no luminance difference when the display device DD operates in a variable frequency mode, flicker phenomenon or luminance uniformity deterioration issues may be solved or reduced.

Figure 6A:
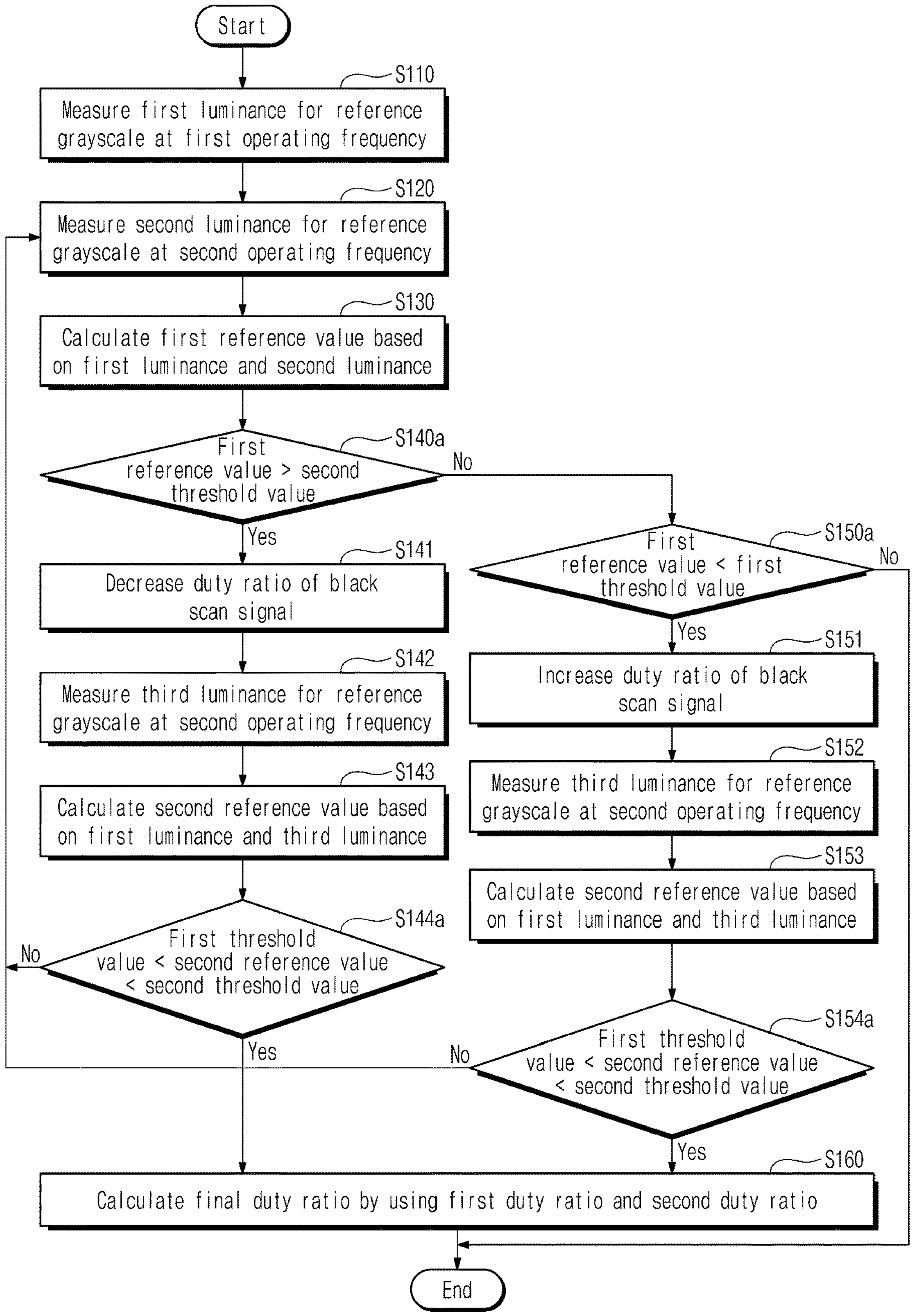
FIG. 6A is a flowchart illustrating a luminance compensation method of a display device, according to an embodiment.
Figure 6B:
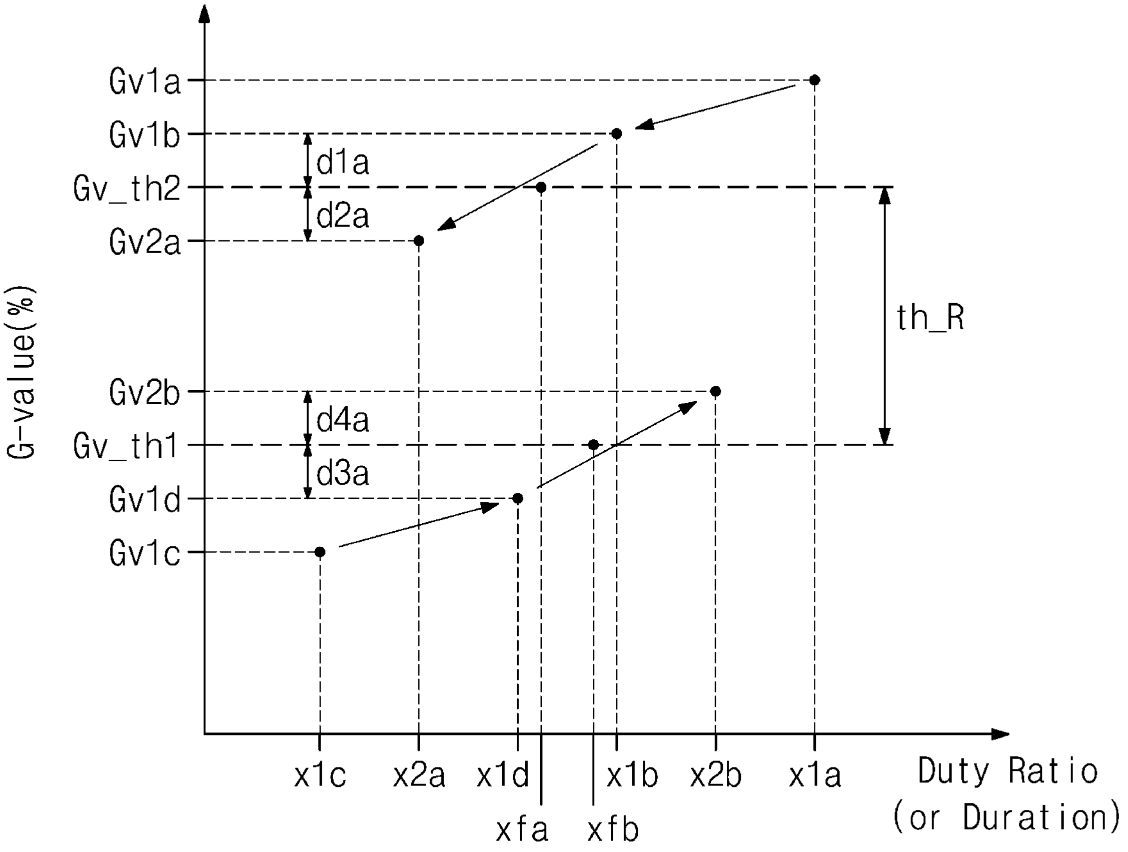
FIG. 6B is a graph for describing a method of setting a duty ratio of a black scan signal, according to an embodiment.

FIG. 6A is a flowchart illustrating a luminance compensation method of a display device, according to an embodiment. FIG. 6B is a diagram for describing a method of setting a duty ratio of a black scan signal, according to an embodiment. The same reference numerals shown in FIG. 6A are assigned to the same operations as those shown in FIG. 5A, and redundant descriptions of the operations will be omitted.

Referring to FIGS. 6A and 6B, a luminance compensation device (or a tuning device) of a display device according to an embodiment may perform the following luminance compensation process (or a tuning process). When initiating a luminance compensation operation (or a tuning operation), the luminance compensation device may first measure first luminance for a reference grayscale at a first operating frequency (S110). In an embodiment, the reference grayscale may be set to one of low grayscales.

Next, in an embodiment, the luminance compensation device may measure second luminance for the reference grayscale at a second operating frequency different from the first operating frequency (S120). The second operating frequency may be a frequency lower than the first operating frequency.

In an embodiment, the luminance compensation device may calculate a first reference value Gv1*a* based on the first luminance and the second luminance (S130). In particular, the first reference value Gv1*a* may be generated based on a difference value between the first luminance and the second luminance. The luminance compensation device may compare a first reference value Gv1*a* and a predetermined second threshold value Gv_th2, and may change a duty ratio (i.e., an initial duty ratio x1*a*) of the black scan signal GBj (i.e., an initialization control signal) to a first duty ratio x1*b* depending on the first comparison result (S140*a*). The second threshold value Gv_th2 may be the highest value of a predetermined threshold range th_R. In an embodiment of the present disclosure, the second threshold value Gv_th2 may be about 4%.

In an embodiment, when the first reference value Gv1*a* is greater than the second threshold value Gv_th2, the luminance compensation device may generate the first duty ratio x1*b* by decreasing the duty ratio (S141). That is, when the first reference value Gv1*a* is greater than the second threshold value Gv_th2, the duration of the active period AP6_*a* (see FIG. 4B) of the black scan signal GBj may decrease by a predetermined change amount.

Afterward, in an embodiment, the luminance compensation device may repeat the same process on the first duty ratio x1*b*. That is, when the first reference value Gv1*b* measured when the black scan signal GBj has the first duty ratio x1*b* is greater than the second threshold value Gv_th2, the duration of the active period AP6_*a* of the black scan signal GBj may decrease by a predetermined change amount. That is, when the first reference value Gv1*b* for the first duty ratio x1*b* is still greater than the second threshold value Gv_th2, the luminance compensation device may reduce the first duty ratio x1*b* and then may generate a second duty ratio x2*a*.

In an embodiment, after the duty ratio is reduced to the second duty ratio x2*a*, the luminance compensation device may measure third luminance for a reference grayscale at the second operating frequency (S142). Afterward, the luminance compensation device may calculate a second reference value Gv2*a* based on the first luminance and the third luminance (S143). In particular, the second reference value Gv2*a* may be generated based on a difference value between the first luminance and the third luminance. The luminance compensation device may compare a second reference value Gv2*a* with the predetermined first threshold value Gv_th1 and the second threshold value Gv_th2 (S144*a*). When the comparison result indicates that the second reference value Gv2*a* is not less than the second threshold value Gv_th2, a procedure may move to the step S120, and the luminance compensation device may repeat the step S120 to the step S144.

In an embodiment, when the comparison result (i.e., the second comparison result) indicates that the second reference value Gv2*a* is greater than a first threshold value Gv_th1 and less than the second threshold value Gv_th2, the luminance compensation device may calculate a final duty ratio xfa by using a first duty ratio (in particular, a previous duty ratio x1*b* and a second duty ratio (i.e., a current duty ratio x2*a*) (S160). The final duty ratio xfa may be a value between the first duty ratio x1*b* and the second duty ratio x2*a*. The final duty ratio xfa may be calculated based on Equation 3 below.

$$xfa = \frac{(x1b \times d2a) + (x2a \times d1a)}{(d1a + d2a)}, \quad \text{[Equation 3]}$$

Here, x1*b* is a first duty ratio, and x2*a* is a second duty ratio. Furthermore, in an embodiment, d1*a* is a first difference value between the first reference value Gv1*b* and the second threshold value Gv_th2, and d2*a* is a second difference value between the second reference value Gv2*a* and the second threshold value Gv_th2. Accordingly, the final duty ratio xfa of the black scan signal GBj capable of outputting the second threshold value Gv_th2 during an operation at the second operating frequency may be calculated based on Equation 3.

Alternatively, in an embodiment, in Equation 3, the duration of the active period AP6_*a* (see FIG. 4B) corresponding to the first duty ratio x1*b* may be substituted instead of the first duty ratio x1*b*, and the duration of the active period AP6_*a* corresponding to the second duty ratio x2*a* may be substituted instead of the second duty ratio x2*a*.

In the meantime, in an embodiment, when a first reference value Gv1*c* is not greater than the second threshold value Gv_th2, the luminance compensation device may determine whether the first reference value Gv1*c* is less than the first threshold value Gv_th1 (S150*a*). In an embodiment, the first threshold value Gv_th1 may be the lowest value of the predetermined threshold range th_R. In an embodiment, the first threshold value Gv_th1 may be about −4%.

In an embodiment, when the first reference value Gv1*c* is less than the first threshold value Gv_th1, the luminance compensation device may generate the first duty ratio x1*d* by decreasing the duty ratio (S151). That is, when the first reference value Gv1*c* is less than the first threshold value Gv_th1, the duration of the active period AP6_*a* of the black scan signal GBj may increase by a predetermined change amount.

In the meantime, in an embodiment, when the first reference value Gv1*c* is not less than the first threshold value Gv_th1 and not greater than the second threshold value Gv_th2, the luminance compensation device may terminate the luminance compensation operation. That is, this corresponds to a case where the first reference value Gv1*c* is positioned within the threshold range th_R. Accordingly, in this case, there is no need to change a duty ratio of the black scan signal GBj, and thus the luminance compensation operation may be terminated immediately.

In an embodiment, afterward, the luminance compensation device may repeat the same process on the first duty ratio x1*d*. That is, when the first reference value Gv1*d* measured when the black scan signal GBj has the first duty ratio x1*d* is less than the first threshold value Gv_th1, the duration of the active period AP6_*a* of the black scan signal GBj may increase by a predetermined change amount. That is, when the first reference value Gv1*d* for the first duty ratio x1*d* is still less than the first threshold value Gv_th1, the luminance compensation device may increase the first duty ratio x1*d* and then may generate a second duty ratio x2*b*.

In an embodiment, after the duty ratio is increased to the second duty ratio x2*b*, the luminance compensation device may measure third luminance for a reference grayscale at the second operating frequency (S152). Afterward, the luminance compensation device may calculate a second reference value Gv2*b* based on the first luminance and the third luminance (S153). In particular, the second reference value Gv2*b* may be generated based on a difference value between the first luminance and the third luminance. The luminance compensation device may compare the second reference value Gv2*b* with the first threshold value Gv_th1 and the second threshold value Gv_th2 (S154*a*). When the second reference value Gv2*b* is not greater than the first threshold value Gv_th1, a procedure may move to the step S120, and the luminance compensation device may repeat the step S120 to the step S154*a*.

In an embodiment, when the comparison result indicates that the second reference value Gv2*b* is greater than the first threshold value Gv_th1 and less than the second threshold value Gv_th2, the luminance compensation device may calculate a final duty ratio xfb by using a first duty ratio (in particular, a previous duty ratio x1*d* and a second duty ratio (i.e., a current duty ratio x2*b*) (S160). The final duty ratio xfb may be a value between the first duty ratio x1*d* and the second duty ratio x2*b*. The final duty ratio xfb may be calculated based on Equation 4 below.

$$xfb = \frac{(x1d \times d4a) + (x2b \times d3a)}{(d3a + d4a)}, \quad \text{[Equation 4]}$$

Here, x1*d* is a first duty ratio, and x2*b* is a second duty ratio. Furthermore, in an embodiment, d3*a* is a first difference value between the first reference value Gv1*d* and the first threshold value Gv_th1, and d4*a* is a second difference value between the second reference value Gv2*b* and the first threshold value Gv_th1. Accordingly, the final duty ratio xfb of the black scan signal GBj capable of outputting the first threshold value Gv_th1 during an operation at the second operating frequency may be calculated based on Equation 4.

Alternatively, in an embodiment, in Equation 4, the duration of the active period AP6_*a* corresponding to the first duty ratio x1*d* may be substituted instead of the first duty ratio x1*d*, and the duration of the active period AP6_*a* corresponding to the second duty ratio x2*b* may be substituted instead of the second duty ratio x2*b*.

As such, in an embodiment, when the display device DD operates at the second operating frequency through a luminance compensation operation (i.e., a tuning operation), the luminance compensation device may set the black scan signal GBj to have the final duty ratio xfa or xfb. Accordingly, because a luminance difference between high-frequency driving and low-frequency driving is positioned within the threshold range th_R when the display device DD operates in a variable frequency mode, flicker phenomenon or luminance uniformity deterioration issues may be solved or reduced.

As such, in an embodiment, the final duty ratio xf1, xf2, xfa, or xfb of the black scan signal GBj, which allows the luminance difference to be positioned within the threshold value Gv_th or the threshold range th_R may be quickly calculated by an interpolation method through Equations 1 to 4, thereby shortening a time required for luminance compensation (or tuning).

Figure 7A:
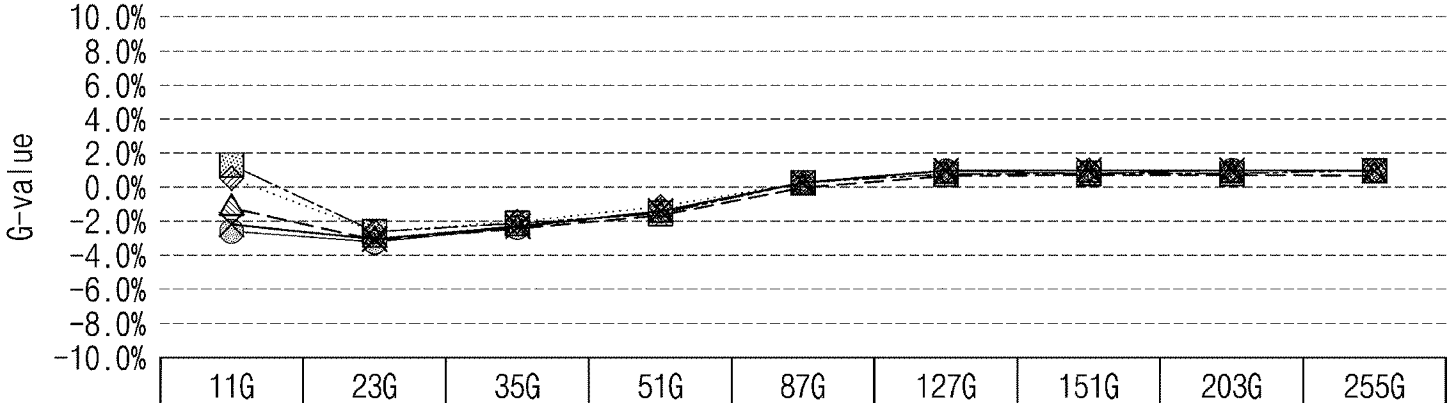
FIG. 7A is a graph showing a change in luminance for each magnitude of second duration of a black scan signal, according to an embodiment.
Figure 7B:
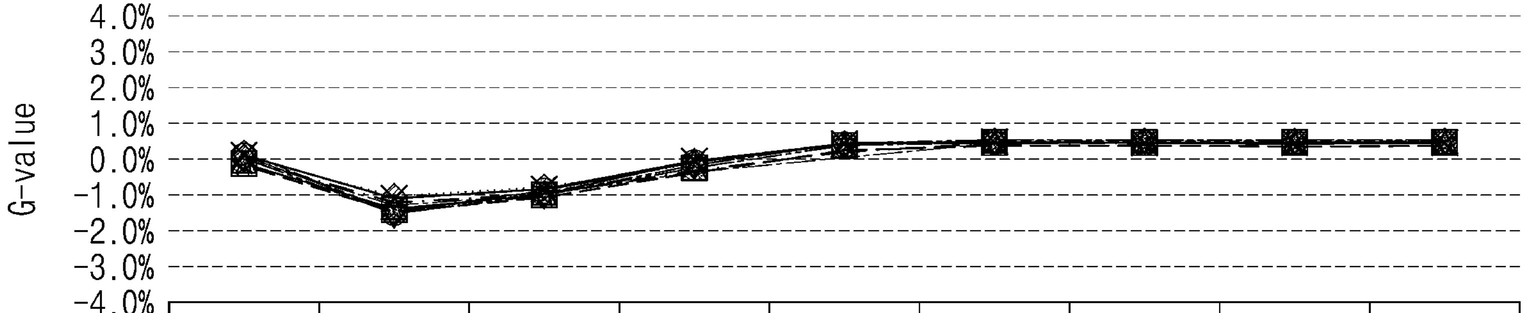
FIG. 7B is a graph showing a change in luminance of display devices to each of which a luminance compensation method according to an embodiment.

FIG. 7A are graphs illustrating a change in luminance according to a duty ratio of a black scan signal, according to an embodiment. FIG. 7B are graphs showing a change in luminance of display devices to each of which a luminance compensation method is applied, according to an embodiment.

In an embodiment and referring to FIG. 7A, first to third graphs G_GB1 to G_GB3, respectively, are graphs generated by measuring reference values for each grayscale in a state where a second duration of the active period AP6_*a* (see FIG. 4B) is changed (i.e., increased) to 1.5 μs, 1.7 μs, and 1.9 us in the holding frames HF1 to HF4 (see FIG. 4B), respectively. Fourth and fifth graphs G_GB4 and G_GB5, respectively, are graphs generated by measuring reference values for each grayscale in a state where the second duration of the active period AP6_*a* is varied (decreased) to 1.4 us and 1.3 us in the holding frames HF1 to HF4, respectively. Moreover, black scan signals in the first to fifth graphs G_GB1 to G_GB5, respectively, have the active period AP6 having first duration (approximately 1.5 μs) (see FIG. 4B) during the second write frame WF2.

In an embodiment, when the first duration and the second duration are the same as each other as 1.5 μs, reference values have been measured to have about −1.14% and about −2.99%, respectively, at a low grayscale (e.g., 11 grayscale and 23 grayscale). However, it is indicated that each reference value is closer to 0% at a low grayscale (e.g., 11 grayscale and 23 grayscale) when the second duration is variable to 1.7 us greater than 1.5 μs. The magnitude of the second duration (e.g., 1.7 μs) may be set through the luminance compensation process described in FIG. 5A.

As such, in an embodiment, when the second duration (or duty ratio) of the black scan signal GBj is adjusted in the holding frame during low-frequency driving, the reference value measured at low grayscale may be prevented from moving away from a threshold value (0%). Accordingly, a luminance difference occurring at a low grayscale during high-frequency driving and low-frequency driving may be improved.

In an embodiment, it is indicated that there is almost no deviation between the reference values measured for each display device (i.e., first to tenth display device DP #1 to DP #10, respectively) when a duty ratio (or a second duration) of the black scan signal GBj is set through the luminance compensation process shown in FIG. 5A, as shown in FIG. 7B. In particular, it is indicated that reference values measured at a low grayscale (e.g., 11 grayscale) have values close to a threshold value (i.e., 0%).

In an embodiment, the luminance compensation device may store the final duty ratio for the measured display device and may calculate an average value thereof (or a mode value). Accordingly, when the luminance compensation device sets the initial duty ratio of the black scan signal GBj to the average value or the most frequent value in a process of compensating for the luminance of the next display device, the luminance compensation device may further shorten a time required for luminance compensation (or tuning).

Figure 8A:
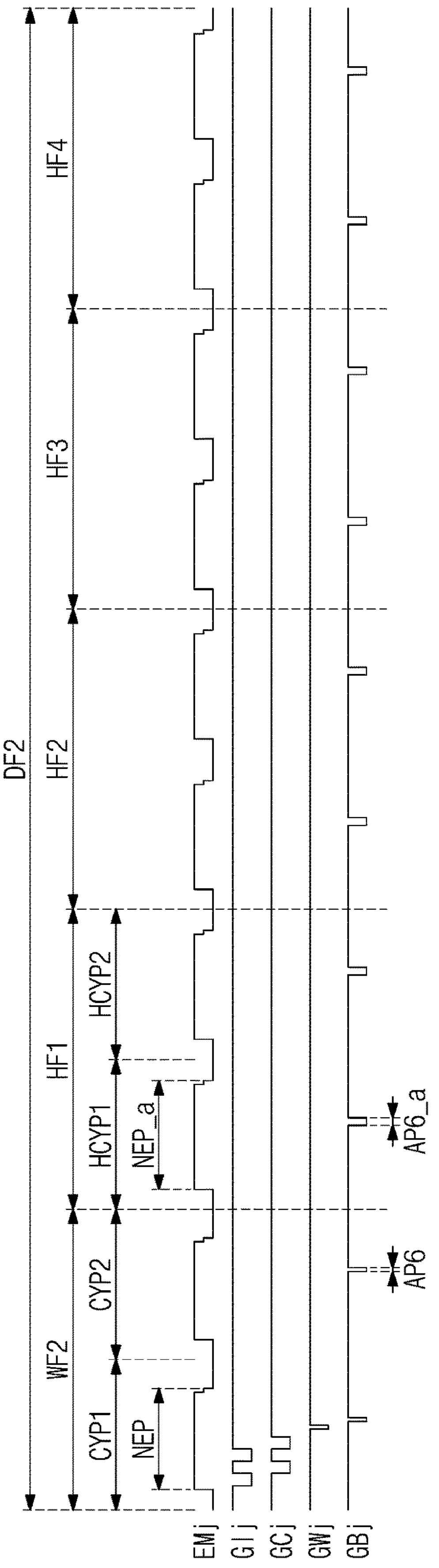
FIG. 8A is a timing diagram for describing a display device operating at a second operating frequency in a variable frequency mode, according to an embodiment.
Figure 8B:
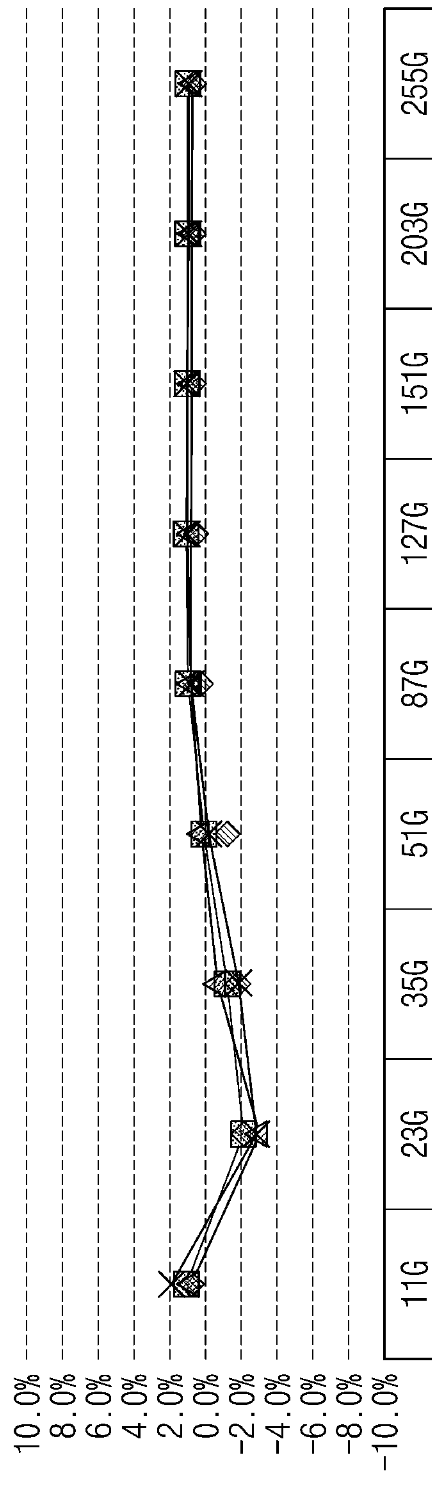
FIG. 8B is a graph showing a luminance change according to a duty ratio of an emission control signal at a low grayscale during an operation at a second operating frequency, according to an embodiment.

FIG. 8A is a timing diagram for describing a display device operating at a second operating frequency in a variable frequency mode, according to an embodiment. FIG. 8B are graphs showing a luminance change according to a duty ratio of an emission control signal at a low grayscale during an operation at a second operating frequency, according to an embodiment.

Referring to FIG. 8A, in an embodiment, a duty ratio of the emission control signal EMj in the second write frame WF2 may be different from a duty ratio of the emission control signal EMj in the holding frames HF1, HF2, HF3, and HF4. During the second write frame WF2, a non-emission period NEP (i.e., referred to as a "first non-emission period") of the emission control signal EMj may have a reference duty ratio. During the holding frames HF1, HF2, HF3, and HF4, a non-emission period NEP_a (i.e., referred to as a "second non-emission period") of the emission control signal EMj may have a variable duty ratio. The variable duty ratio may be greater or less than a reference duty ratio. In an embodiment, when the reference duty ratio is about 3%, the variable duty ratio may be about 10% or about 15%. The first non-emission period NEP may have a third duration, and the second non-emission period NEP_a may have a fourth duration different from the third duration. In an embodiment, the fourth duration may be greater than the third duration. The duty ratio of the second non-emission period NEP_a may be changed by adjusting the rising and falling time points of the second non-emission period NEP_a. For example, the duty ratio of the second non-emission period NEP_a may be increased by advancing the rising time point of the second non-emission period NEP_a. The duty ratio of the second non-emission period NEP_a may be increased by delaying the falling time point of the second non-emission period NEP_a.

In an embodiment, when the first holding frame HF1 is started, the duty ratio of the emission control signal EMj may be adjusted from the start time of the first holding frame HF1. However, the present invention is not limited thereto. The duty ratio of the emission control signal EMj may be adjusted from the start time of the second or third holding frame HF2 or HF3, respectively, or may be adjusted from the start time of the second holding cycle period HCYP2 of the first holding frame HF1.

In an embodiment and referring to FIG. 8B, when the duty ratio of the first non-emission period NEP of the emission control signal EMj is 3%, first and second graphs G_EM1 and G_EM2, respectively, are graphs generated by measuring reference values for each grayscale for a case of increasing the duty ratio of the second non-emission period NEP_a to 10% and 15%, respectively. In the first and second graphs G_EM1 and G_EM2, respectively, the duty ratio of the second non-emission period NEP_a may be obtained by delaying the falling time point of the second non-emission period NEP_a. Moreover, the first and second graphs G_EM1 and G_EM2, respectively, show that the duration of the active period AP6_*a* of the black scan signal GBj is reduced to 1.0 us and 1.3 us in each of the holding frames HF1, HF2, HF3, and HF4, respectively. In an embodiment, the duration of the active period AP6 (see FIG. 4B) of the black scan signal GBj in the second write frame may be 1.5 μs.

Also, in an embodiment, when the duty ratio of the first non-emission period NEP of the emission control signal EMj is 3%, third and fourth graphs G_EM3 and G_EM4, respectively, are graphs generated by measuring reference values for each grayscale for a case of increasing the duty ratio of the second non-emission period NEP_a to 10% and 15%, respectively. In the third and fourth graphs G_EM3 and G_EM4, respectively, the duty ratio of the second non-emission period NEP_a may be obtained by advancing the rising time point of the second non-emission period NEP_a. Besides, the third and fourth graphs G_EM3 and G_EM4, respectively, show that the duration of the active period AP6_*a* of the black scan signal GBj is increased to 1.7 μs in each of the holding frames HF1, HF2, HF3, and HF4.

In an embodiment, even though the second duration of the active period AP6_*a* of the black scan signal GBj does not increase when the duty ratio of the second non-emission period NEP_a is increased to 15%, the reference value is measured to have about 1.00% close to the threshold value (0%) at the 11 grayscale. In the luminance compensation process disclosed in FIG. 5A, the duty ratio of the second non-emission period NEP_a may be calculated by substituting the duty ratio (or duration) of the emission control signal EMj instead of the duty ratio (or duration) of the black scan signal GBj.

As such, in an embodiment, when the fourth duration (or duty ratio) of the emission control signal EMj is adjusted in each of the holding frames HF1, HF2, HF3, and HF4 during low-frequency driving, the reference value measured at low grayscale may be prevented from moving away from a threshold value (0%). Accordingly, a luminance difference occurring at a low grayscale during high-frequency driving and low-frequency driving may be improved.

Figure 9A:
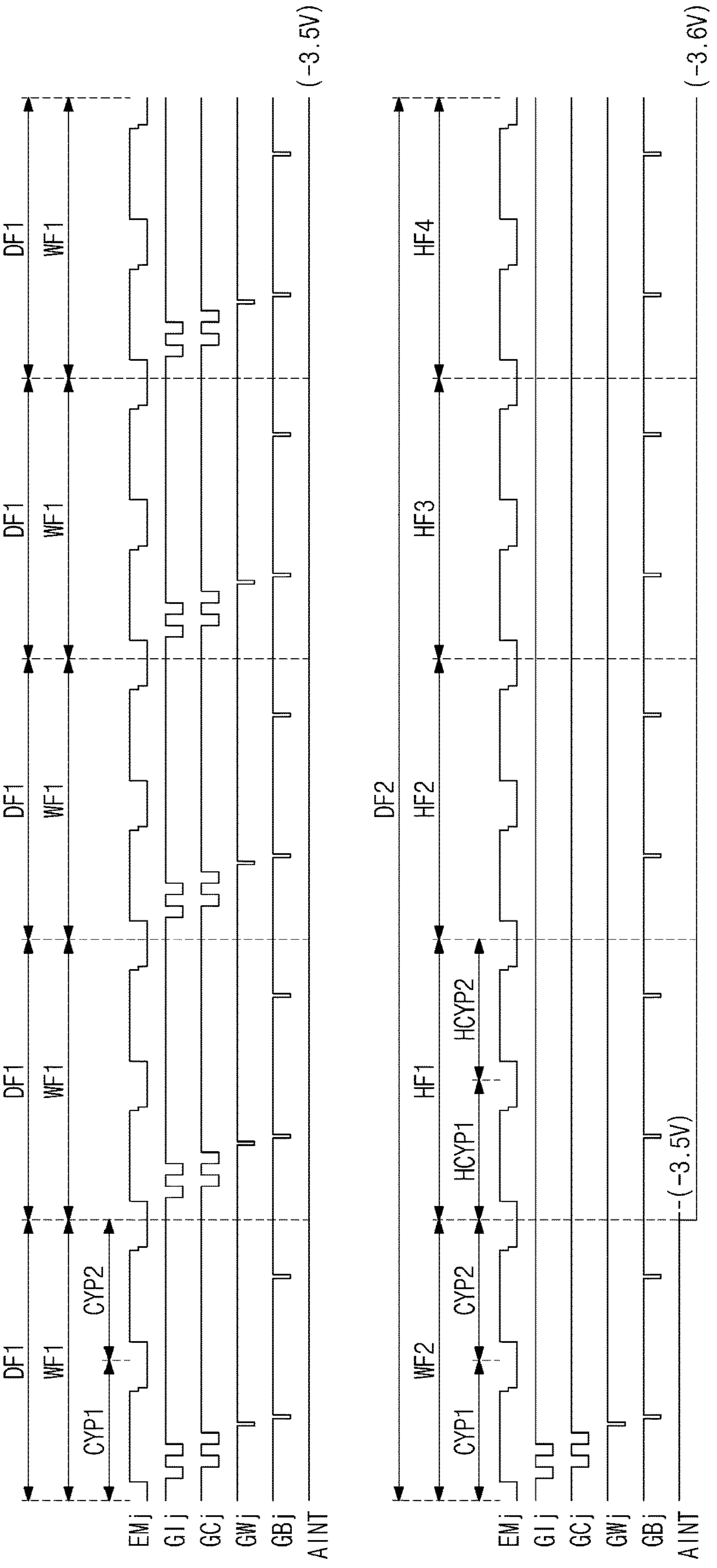
FIG. 9A is a timing diagram for describing a display device operating at a second operating frequency in a variable frequency mode, according to an embodiment.
Figure 9B:
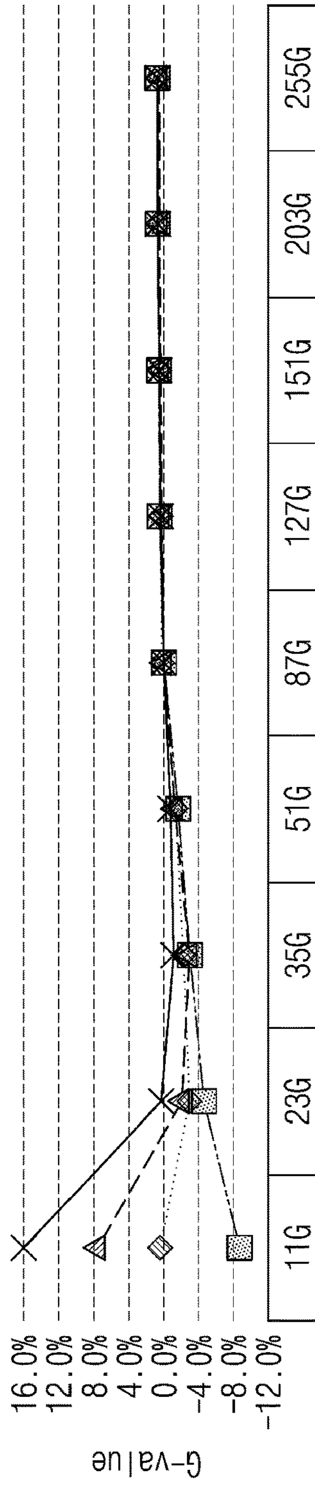
FIG. 9B is a graph showing a luminance change according to a voltage level of an anode initialization voltage at a low grayscale during an operation at a second operating frequency, according to an embodiment.

FIG. 9A is a timing diagram for describing a display device operating at a second operating frequency in a variable frequency mode, according to an embodiment. FIG. 9B are graphs showing a luminance change according to a voltage level of an anode initialization voltage at a low grayscale during an operation at a second operating frequency, according to an embodiment.

In an embodiment and referring to FIG. 9A, the anode initialization voltage AINT may be varied at a specific time point during the second driving frame DF2 operating at a second operating frequency. In the meantime, the anode initialization voltage AINT may be maintained at a constant level during the first driving frame DF1 operating at a first operating frequency.

In an embodiment, the driving controller 100 may determine whether the second operating frequency corresponds to one of predetermined compensation frequencies, and may output a voltage control signal VCS (see FIG. 1) depending on the determination result. The voltage generator 400 may change a voltage level of the anode initialization voltage AINT in response to the voltage control signal VCS.

In an embodiment, the voltage level of the anode initialization voltage AINT may be down at the start time of each of the holding frames HF1, HF2, HF3, and HF4 of the second driving frame DF2. For example, during the second write frame WF2 of the second driving frame DF2, the anode initialization voltage AINT may be maintained at a first voltage level (e.g., about −3.5 V). However, from the start time of the holding frames HF1, HF2, HF3, and HF4 (in particular, the first holding frame HF1), the anode initialization voltage AINT may be down from a first voltage level to a second voltage level (e.g., about −3.6 V).

In an embodiment, FIG. 9A shows that the anode initialization voltage AINT is changed within the first holding frame HF1. However, the present invention may not be limited thereto. For example, the anode initialization voltage AINT may be changed at the start time of the second or third holding frame HF2 or HF3 among the holding frames HF1, HF2, HF3, and HF4. In an embodiment, during the holding frames HF1, HF2, HF3, and HF4, the anode initialization voltage AINT is maintained at the second voltage level. However, the present invention may not be limited thereto. For example, the anode initialization voltage AINT may be varied in units of at least one holding frame or in units of at least one holding cycle. During the holding frames HF1, HF2, HF3, and HF4, the anode initialization voltage AINT may be gradually (stepwise) varied (increased or decreased).

In an embodiment, in FIG. 9B, first to fourth graphs Gh1, Gh2, Gh3, and Gh4, respectively, are graphs generated by measuring reference values for each grayscale in a state where the voltage level of the anode initialization voltage AINT has −3.5 V, −3.6 V, −3.7 V, and −3.8 V during each of the holding frames HF1, HF2, HF3, and HF4, respectively.

In an embodiment, a reference value is measured to have about 0.38%, which is closest to the threshold value (0%) at 11 grayscale when the anode initialization voltage AINT is decreased from −3.5 V to −3.6 V. In a luminance compensation process disclosed in FIG. 5A, the second voltage level of the anode initialization voltage AINT may be calculated by substituting the second voltage level of the anode initialization voltage AINT instead of the duty ratio (or duration) of the black scan signal GBj.

As such, in an embodiment, when the voltage level of the anode initialization voltage AINT is adjusted in each of the holding frames HF1, HF2, HF3, and HF4 during low frequency driving, the reference value measured at low grayscale may be prevented from moving away from a threshold value (0%). Accordingly, a luminance difference occurring at a low grayscale during high-frequency driving and low-frequency driving may be improved.

Figure 10A:
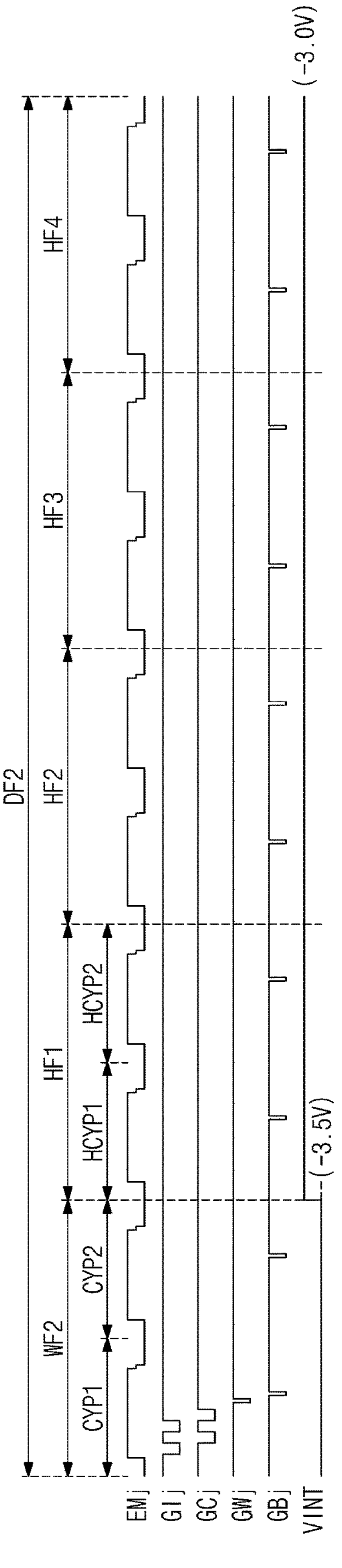
FIG. 10A is a timing diagram for describing a display device operating at a second operating frequency in a variable frequency mode, according to an embodiment.
Figure 10B:
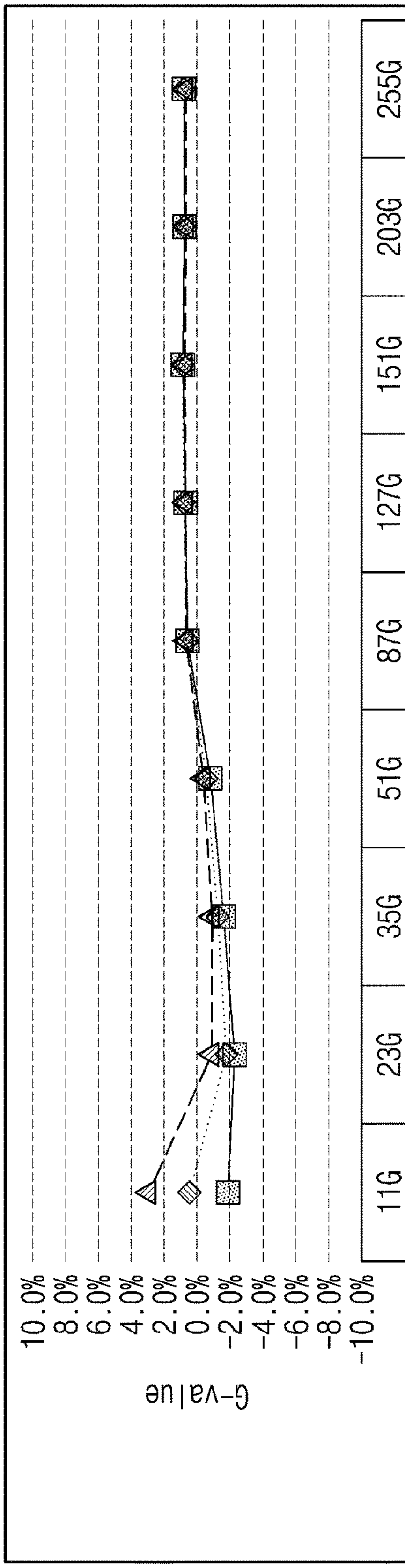
FIG. 10B is a graph showing a luminance change according to a voltage level of an initialization voltage at a low grayscale during an operation at a second operating frequency, according to an embodiment.

FIG. 10A is a timing diagram for describing a display device operating at a second operating frequency in a variable frequency mode, according to an embodiment. FIG. 10B are graphs showing a luminance change according to a voltage level of an initialization voltage at a low grayscale during an operation at a second operating frequency, according to an embodiment.

In an embodiment, referring to FIG. 10A, the initialization voltage VINT may be varied at a specific time point during the second driving frame DF2 operating at a second operating frequency.

In an embodiment, the voltage level of the initialization voltage VINT may be down at the start time of each of the holding frames HF1, HF2, HF3, and HF4 of the second driving frame DF2. For example, during the second write frame WF2 of the second driving frame DF2, the initialization voltage VINT may be maintained at a first voltage level (e.g., about −3.5 V). However, from the start time of the holding frames HF1, HF2, HF3, and HF4 (in particular, the first holding frame HF1), the initialization voltage VINT may rise from a first voltage level to a third voltage level (e.g., about −3.0 V).

In an embodiment, FIG. 10A shows that the initialization voltage VINT is changed within the first holding frame HF1. However, the present invention may not be limited thereto. For example, the initialization voltage VINT may be changed at the start time of the second or third holding frame HF2 or HF3, respectively, among the holding frames HF1, HF2, HF3, and HF4. In an embodiment, during the holding frames HF1, HF2, HF3, and HF4, the initialization voltage VINT is maintained at the second voltage level. However, the present invention may not be limited thereto. For example, the initialization voltage VINT may be varied in units of at least one holding frame or in units of at least one holding cycle. During the holding frames HF1, HF2, HF3, and HF4, the initialization voltage VINT may be gradually (stepwise) varied (increased or decreased).

In an embodiment, in FIG. 10B, fifth to seventh graph Gh5 to Gh7, respectively, are graphs generated by measuring reference values for each grayscale in a state where the voltage level of the initialization voltage VINT has −3.5 V, −3.0 V, and −2.5 V during each of the holding frames HF1, HF2, HF3, and HF4, respectively.

In an embodiment, a reference value is measured to have 0.36%, which is closest to the threshold value (0%) at 11 grayscale when the initialization voltage VINT is increased from −3.5 V to −3.0 V. In the luminance compensation process disclosed in FIG. 5A, the third voltage level of the initialization voltage VINT may be calculated by substituting the third voltage level of the initialization voltage VINT instead of the duty ratio (or duration) of the black scan signal GBj.

In an embodiment, as such, when the voltage level of the initialization voltage VINT is adjusted in each of the holding frames HF1, HF2, HF3, and HF4 during low frequency driving, the reference value measured at low grayscale may be prevented from moving away from a threshold value (0%). Accordingly, a luminance difference occurring at a low grayscale during high-frequency driving and low-frequency driving may be improved.

Although an embodiment has been described for illustrative purposes, those skilled in the art will appreciate that various modifications, and substitutions are possible, without departing from the scope and spirit of the present invention as disclosed in the accompanying claims. Accordingly, the technical scope of the present invention is not limited to the detailed description, but should be defined by the claims.

According to an embodiment, issues of lowering the luminance uniformity of a display device due to the small luminance difference between high-frequency driving and low-frequency driving in a variable frequency mode may be solved or reduced.

While the invention has been described with reference to embodiments thereof, it will be apparent to those of ordinary skill in the art that various changes and modifications may be made thereto without departing from the spirit and scope of the present disclosure as set forth in the following claims.

What is claimed is:

1. A method for compensating for luminance of a display device including a light emitting element and a pixel driving circuit connected to the light emitting element and configured to receive an initialization control signal, the method comprising:

measuring a first luminance for a reference grayscale at a first operating frequency;

measuring a second luminance for the reference grayscale at a second operating frequency, wherein the second operating frequency is different from the first operating frequency;

calculating a first reference value based on the first luminance and the second luminance;

comparing the first reference value and a threshold value to output a first comparison result, changing a first duty ratio of the initialization control signal into a second duty ratio depending on the first comparison result;

after the first duty ratio is changed into the second duty ratio, measuring a third luminance for the reference grayscale at the second operating frequency;

calculating a second reference value based on the first luminance and the third luminance;

comparing the second reference value with the threshold value to output a second comparison result; and calculating a final duty ratio corresponding to the threshold value using the first duty ratio and the second duty ratio responsive to the second comparison result.

2. The method of claim 1, wherein the changing of the first duty ratio into the second duty ratio includes:

when the first reference value is greater than the threshold value, generating the second duty ratio by decreasing the first duty ratio, and wherein the comparing of the second reference value with the threshold value includes:

when the second reference value is less than the threshold value, generating the final duty ratio using the first duty ratio and the second duty ratio.

3. The method of claim 1, wherein the changing of the first duty ratio into the second duty ratio includes:

when the first reference value is less than the threshold value, generating the second duty ratio by increasing the first duty ratio, and wherein the comparing of the second reference value with the threshold value includes:

when the second reference value is greater than the threshold value, generating the final duty ratio using the first duty ratio and the second duty ratio.

4. The method of claim 1, wherein the final duty ratio is a value between the first duty ratio and the second duty ratio.

5. The method of claim 4, wherein the final duty ratio for the threshold value is calculated based on a linear interpolation function using the first duty ratio, the second duty ratio, a first difference value between the first reference value and the threshold value, and a second difference value between the second reference value and the threshold value.

6. The method of claim 1, wherein, when the second reference value is equal to the threshold value, the second duty ratio of the initialization control signal is calculated as the final duty ratio.

7. The method of claim 1, wherein a first driving frame at the first operating frequency includes a first write frame, wherein a second driving frame at the second operating frequency includes a second write frame and at least one holding frame, and wherein the first duty ratio of the initialization control signal is changed after a start time of the holding frame.

8. The method of claim 7, wherein the pixel driving circuit includes:

an anode initialization transistor connected between a first electrode of the light emitting element and an anode initialization voltage line and configured to operate in response to the initialization control signal, and wherein an anode initialization voltage is supplied to the anode initialization voltage line.

9. The method of claim 8, wherein the initialization control signal includes:

an active period activated within the first write frame, the second write frame, and the holding frame, and wherein the anode initialization transistor outputs the anode initialization voltage to the first electrode during the active period.

10. The method of claim 9, wherein a duration of the active period is set depending on the final duty ratio.

11. The method of claim 1, wherein the threshold value includes a first threshold value and a second threshold value which is higher than the first threshold value.

12. The method of claim 11, wherein the changing of the first duty ratio into the second duty ratio includes:

when the first reference value is greater than the second threshold value, generating the second duty ratio by decreasing the first duty ratio, and wherein the comparing of the second reference value with the threshold value includes:

when the second reference value is less than the second threshold value and is greater than the first threshold value, generating the final duty ratio using the first duty ratio and the second duty ratio.

13. The method of claim 11, wherein the changing of the first duty ratio into the second duty ratio includes:

when the first reference value is less than the first threshold value, generating the second duty ratio by increasing the first duty ratio, and wherein the comparing of the second reference value with the threshold value includes:

when the second reference value is greater than or equal to the first threshold value and is less than the second threshold value, generating the final duty ratio using the first duty ratio and the second duty ratio.

14. The method of claim 11, wherein the final duty ratio is a value between the first duty ratio and the second duty ratio.

15. The method of claim 14, wherein the calculating the final duty ratio comprises:

calculating the final duty ratio for the second threshold value based on a first linear interpolation function using the first duty ratio, the second duty ratio, a first difference value between the first reference value and the second threshold value, and a second difference value between the second reference value and the second threshold value; or calculating the final duty ratio for the first threshold value based on a second linear interpolation function using the first duty ratio, the second duty ratio, a third difference value between the first reference value and the first threshold value, and a fourth difference value between the second reference value and the first threshold value.

16. The method of claim 1, wherein the pixel driving circuit further receives an emission control signal, and wherein a final duty ratio of the emission control signal is calculated through the same process as a calculation process of the final duty ratio.

17. The method of claim 16, wherein the pixel driving circuit includes:

a driving transistor connected between the light emitting element and a voltage line and configured to operate in response to a voltage level of a first node;

an anode initialization transistor connected between the light emitting element and an anode initialization voltage line and configured to receive the initialization control signal; and an emission control transistor connected between the light emitting element and the driving transistor and configured to receive the emission control signal.

18. The method of claim 17, wherein an anode initialization voltage is applied to the anode initialization voltage line, and wherein a voltage level of the anode initialization voltage is calculated through the same process as the calculation process of the final duty ratio of the initialization control signal.

19. A display device comprising:

a display panel including a plurality of pixels; and a panel driver configured to drive the display panel in a first mode where an operating frequency is fixed, and a second mode where the operating frequency is variable, wherein each of the plurality of pixels includes a light emitting element and a pixel driving circuit connected to the light emitting element and configured to receive an initialization control signal, wherein the pixel driving circuit includes an anode initialization transistor connected between a first electrode of the light emitting element and an anode initialization voltage line and configured to operate in response to the initialization control signal, and wherein the panel driver is configured to:

determine whether the operating frequency corresponds to one of predetermined compensation frequencies in the second mode; and adjust a duty ratio of the initialization control signal depending on a determination result, wherein an anode initialization voltage is supplied to the anode initialization voltage line, and wherein the panel driver is configured to:

determine whether the operating frequency corresponds to one of the compensation frequencies in the second mode; and adjust a voltage level of the anode initialization voltage depending on a determination result.

20. An electronic device comprising a display device, the display device comprising:

a display panel including a plurality of pixels; and a panel driver configured to drive the display panel in a first mode where an operating frequency is fixed, and a second mode where the operating frequency is variable, wherein each of the plurality of pixels includes a light emitting element and a pixel driving circuit connected to the light emitting element and configured to receive an initialization control signal, wherein the pixel driving circuit includes an anode initialization transistor connected between a first electrode of the light emitting element and an anode initialization voltage line and configured to operate in response to the initialization control signal, and wherein the panel driver is configured to:

determine whether the operating frequency corresponds to one of predetermined compensation frequencies in the second mode; and adjust a duty ratio of the initialization control signal depending on a determination result, wherein an anode initialization voltage is supplied to the anode initialization voltage line, and wherein the panel driver is configured to:

determine whether the operating frequency corresponds to one of the compensation frequencies in the second mode; and adjust a voltage level of the anode initialization voltage depending on a determination result.

* * * * *